US009688472B1

(12) United States Patent
Stubbs et al.

(10) Patent No.: US 9,688,472 B1
(45) Date of Patent: Jun. 27, 2017

(54) MOBILE ROBOT MANIPULATOR

(71) Applicant: Amazon Technologies, Inc., Seattle, WA (US)

(72) Inventors: Andrew Stubbs, Waltham, MA (US); John Gregory Longtine, Sudbury, MA (US); Diane Grieselhuber Mills, Wilmington, MA (US); Parris S. Wellman, Reading, MA (US); Matthew David Verminski, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/965,409

(22) Filed: Dec. 10, 2015

(51) Int. Cl.
*B65G 1/137* (2006.01)
*B25J 9/16* (2006.01)
(Continued)

(52) U.S. Cl.
CPC .......... *B65G 1/1373* (2013.01); *B25J 9/0096* (2013.01); *B25J 9/162* (2013.01); *B25J 9/1664* (2013.01);
(Continued)

(58) Field of Classification Search
CPC .................................................... B65G 1/1373
See application file for complete search history.

(56) References Cited

U.S. PATENT DOCUMENTS 6,842,665 B2 * 1/2005 Karlen .................... B63B 25/22
108/51.11

7,504,949 B1 * 3/2009 Rouaix .................. G06Q 10/06
235/375
(Continued)

FOREIGN PATENT DOCUMENTS

WO         2013119942         8/2013

OTHER PUBLICATIONS

U.S. Appl. No. 14/497,110, filed Sep. 25, 2014, Titled: *Wireless Visualization Interface for Autonomous Ground Vehicle Signal Coverage*.
(Continued)

*Primary Examiner* — Thomas Randazzo
(74) *Attorney, Agent, or Firm* — Kilpatrick Townsend & Stockton LLP

(57) ABSTRACT

Embodiments are described for implementing a mobile inventory transfer station within a workspace of an inventory management system. In embodiments, inventory transfer instructions for moving inventory stored within container holders in a workspace may be received. A portion of container holders within the workspace may be identified based on characteristics associated with the items of the inventory transfer instructions and first information identifying the items stored in the portion of container holders. A mobile container unit and a mobile manipulator unit may be selected based on distances between the units and the identified portion of container holders within the workspace. Instructions may be transmitted to the mobile container unit and mobile manipulator unit for navigating to the identified portion of container holders in the workspace and transferring inventory between a particular container holder and a container associated with the mobile container unit by the mobile manipulator unit.

20 Claims, 12 Drawing Sheets

(51) Int. Cl.
    *B25J 9/00*      (2006.01)
    *B65G 1/06*      (2006.01)
    *G06Q 10/08*     (2012.01)

(52) U.S. Cl.
    CPC ............ *B65G 1/06* (2013.01); *G06Q 10/087* (2013.01); *Y10S 901/01* (2013.01)

(56) References Cited

U.S. PATENT DOCUMENTS

| | | | |
|---|---|---|---|
| 8,280,547 B2 | 10/2012 | D'Andrea et al. | |
| 8,483,869 B2* | 7/2013 | Wurman | B65G 1/1378 414/807 |
| 8,798,786 B2* | 8/2014 | Wurman | B65F 3/00 700/214 |
| 8,983,647 B1* | 3/2015 | Dwarakanath | G06Q 10/087 700/216 |
| 9,008,827 B1* | 4/2015 | Dwarakanath | G06Q 10/087 700/213 |
| 9,087,314 B2 | 7/2015 | Hoffman et al. | |
| 9,090,400 B2 | 7/2015 | Wurman et al. | |
| 9,111,251 B1* | 8/2015 | Brazeau | G06Q 10/087 |
| 9,120,622 B1* | 9/2015 | Elazary | B65G 1/1373 |
| 9,367,830 B2* | 6/2016 | Keller | G06Q 10/087 |
| 9,378,482 B1* | 6/2016 | Pikler | G06Q 10/087 |
| 9,409,711 B1* | 8/2016 | Hanssen | B65G 1/1378 |
| 2007/0119123 A1* | 5/2007 | Clark | B25J 15/0052 53/430 |
| 2009/0185884 A1* | 7/2009 | Wurman | B65G 1/1378 414/270 |
| 2014/0100998 A1 | 4/2014 | Wilson et al. | |
| 2015/0032252 A1* | 1/2015 | Galluzzo | B25J 5/007 700/218 |
| 2015/0073589 A1* | 3/2015 | Khodl | B25J 5/007 700/218 |
| 2016/0101940 A1* | 4/2016 | Grinnell | G05D 1/0297 700/216 |

OTHER PUBLICATIONS

U.S. Appl. No. 14/572,332, filed Dec. 16, 2014, Titled: *Robotic Grasping of Items in Inventory System*.
U.S. Appl. No. 14/572,420, filed Dec. 16, 2014, Titled: *Generating Robotic Grasping Instructions for Inventory Items*.
U.S. Appl. No. 14/662,679, filed Mar. 19, 2015, Titled: *Systems and Methods for Removing Debris From Warehouse Floors*.
Fetch. Screenshots of Video "Warehouse" at 0:20-0:34 and "Meet Fetch and Freight" at 0:27-0:55 [online]. Fetch Robotics, Aug. 2015 [retrieved on Dec. 15, 2015]. Retrieved from the Internet: <URL: http://fetchrobotics.com/>, 56 pages.
PCT/US2016/065424, "International Search Report and Written Opinion", Mar. 21, 2017, 13 pages.
Rico. Amazon Picking Challenge 2015—Team RBO (speed x4). [online] May 29, 2015 [retrieved on Mar. 6, 2017]. Retrieved from the Internet: <URL: https://www.youtube.com/watch•v=LtWPH-bcc4M.
Tobe, Frank, 30,000 robots now work at Amazon; competing systems emerging. [online] The Robot Report Nov. 1, 2015 [retrieved on Apr. 10, 2017]. Retrieved from the Internet: <URL: https://www.therobotreport.com/news/amazon-has-30000-kiva-robots-at-work-alternatives-begin-to-compute>. 4 pages.

* cited by examiner

MOBILE ROBOT MANIPULATOR

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

Figure 1:
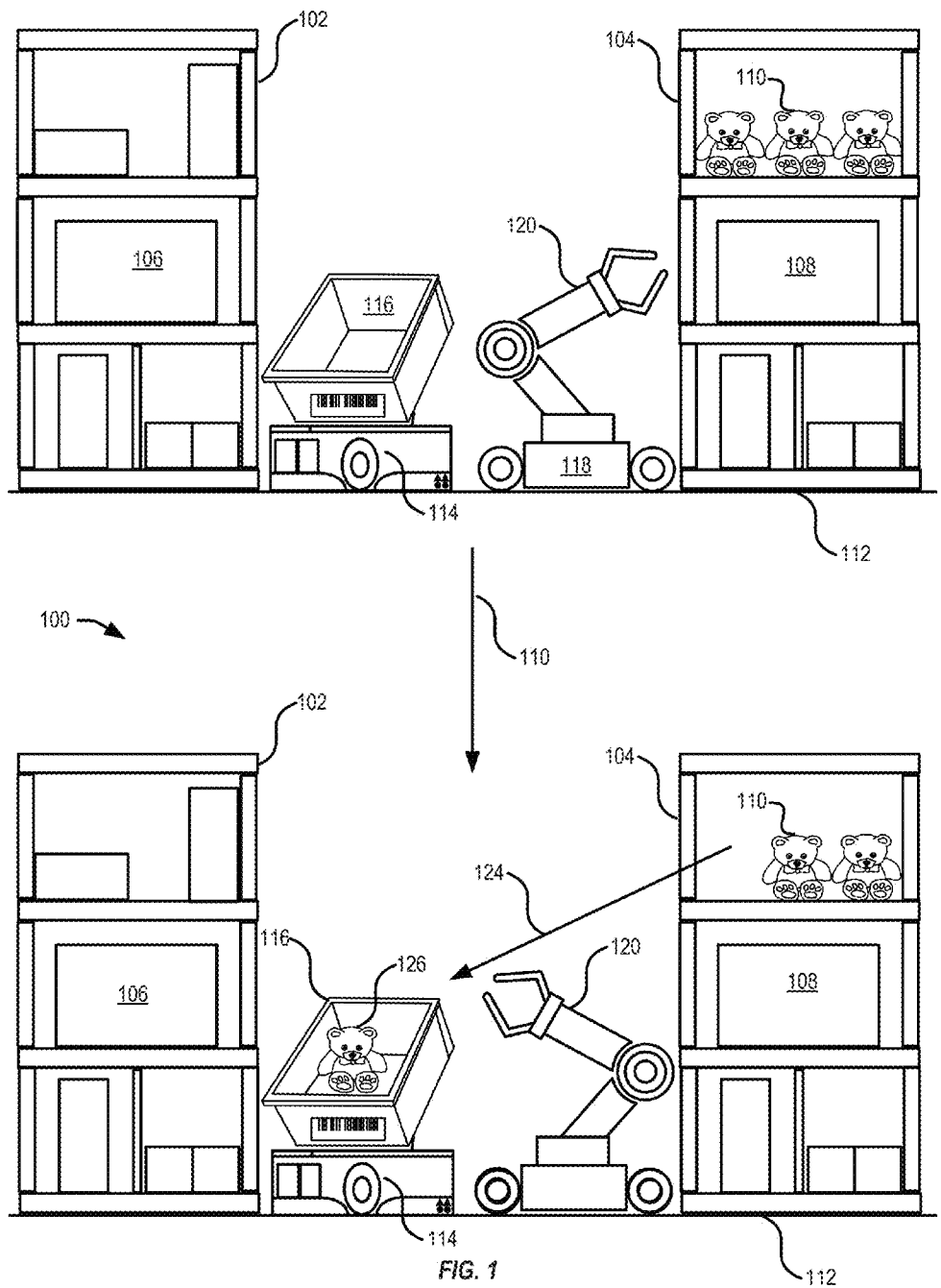
FIG. 1 illustrates an example workflow for a mobile inventory transfer station in a workspace as described herein, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory management system having multiple container holders and drive units for inventory within the inventory management system. Specifically, features herein are directed to managing the transfer of inventory at mobile inventory transfer stations within the inventory management system. The container holders may include one or more containers configured to hold items within the inventory management system. Unmanned mobile drive units are provided to move inventory, via mobile totes or entire container holders, among one or more locations of a facility (e.g., a warehouse or workspace) within the inventory management system. The container holders may operate within one or more areas of the facility and hold inventory items (within the containers) going to or coming from other areas of the facility or outside the facility. The container holders may be placed next to other container holders to form one or more rows of dense storage. Mobile container units, which may be a separate unmanned mobile drive unit or a modified unmanned mobile drive unit, may utilize mobile totes to transfer inventory within the inventory management system according to instructions from a management module. The mobile totes may be examples of the containers stored in the container holders and also may be configured to temporarily store inventory that is being moved in the inventory management system. In embodiments, mobile manipulator units with robotic arms may transfer inventory between the mobile container units and/or the container holders within the inventory management system. In this way a mobile inventory transfer station may be created at any area within the inventory management system by providing instructions to the mobile container units, mobile drive units, and mobile manipulator units to transfer inventory within the facility.

A facility may generally operate at full capacity meaning that the location and configuration of the container holders and the virtual mobile inventory transfer stations described herein enable efficient use of the space within the facility and increase the efficiency of fulfilling inventory transfer orders or inventory processing. Virtual mobile inventory transfer stations (mobile inventory transfer stations) as used herein refer to areas or locations within the inventory management system where one or more of a mobile container unit, a mobile drive unit, and a mobile manipulator unit may operate to transfer inventory, and thereafter move to other areas or locations within the inventory management system to transfer inventory. The ethereal nature of the mobile inventory transfer station allows for multiple, dynamic layouts and configurations for the container holders within a facility to maximize use of the space. Further, mobile inventory transfer stations can be implemented in multiple inventory management system configurations which may include dedicated areas (such as the areas where inventory is processed as discussed above) for inventory processing while still providing a benefit of freeing up more footprint space for other operations within the facility by removing immobile inventory transfer stations, e.g., conventional workstations for dedicated inventory processing.

In a non-limiting example, a computer system that includes a management module for implementing the mobile inventory transfer station features, described herein, may receive an order for an item of inventory stored within a workspace. The workspace may include several areas where one or more container holders store various items of inventory. In an embodiment, the computer system may identify a portion of container holders within the workspace that can be utilized to fulfill the order for the item. The computer system may select an appropriate mobile container unit, mobile drive unit, and mobile manipulator unit based on their respective distance within the workspace to an area of the workspace associated with the identified portion of container holders. Instructions may be provided to the mobile container unit with an associated container to move to the area of the identified portion of container holders. Instructions may be provided to the mobile drive unit to move to the area of the identified portion of the container holders and move, rotate, or otherwise manipulate one or more container holders to facilitate retrieval of the item. Instructions may be provided to the mobile manipulator unit to move to the area and transfer the item from the portion of container holders to the associated container of the mobile container unit. The mobile manipulator unit may utilize a robotic arm to grasp and transfer the item from one of the container holders. Thereafter, further instructions may be provided to the mobile container unit to move the associated container with the item to a different area of the workspace or to leave the workspace all together.

In accordance with at least one embodiment, the computer system implementing the mobile inventory transfer station features described herein may maintain information identifying the location of a plurality of mobile container units, mobile drive units, and mobile manipulator units at any given time within the workspace. In embodiments, the computer system may maintain information indicating a default location for each mobile manipulator unit of the plurality of mobile manipulator units within the facility. In some examples, a particular mobile manipulator unit may be located near one or more areas of interest within the facility. An area of interest within the facility, as used herein, can include a location of one or more container holders within the facility that are frequently accessed by the mobile container units, the mobile drive units, and the mobile manipulator units for fulfilling inventory transfer orders. In accordance with at least one embodiment, an area of interest may be created by instructions provided by the computer system based at least in part on characteristics of the items stored and/or associated with container holders. In some embodiments, an area of interest may be created based at least in part on distance in the facility between a portion of container holders and another area of the facility such as a shipping processing area or other suitable area within the facility. Characteristics of items may include the velocity of throughput of the item for inventory processing, a type of item, a type of packing for the item, order history information associated with an item indicating that the item is usually ordered with another item, or physical characteristics associated with the item such as size (i.e., physical dimensions) and weight. In embodiments, mobile drive units may be configured to move one or more container holders within the workspace to create an area of interest or a suitable area for forming the virtual mobile inventory transfer station. In an embodiment, a portion of container holders may be moved from a first area within the workspace to a second area of the workspace to form a virtual mobile inventory transfer station. In accordance with at least one embodiment, a portion of container holders may be arranged or re-arranged from a first configuration within the identified area of interest to a second configuration for forming the virtual mobile inventory transfer station.

FIG. 1 illustrates an example workflow for a mobile inventory transfer station in a workspace as described herein, in accordance with at least one embodiment. The workflow 100 of FIG. 1 includes container holders 102 and 104 with one or more containers 106 and 108 that may include inventory. The container holders 102 and 104 may be configured to store an item, such as item 110, that is not in a container. The container holders 102 and 104 may rest on the floor 112 of a facility configured to store a plurality of container holders. The workflow 100 of FIG. 1 includes a mobile container unit 114 with an associated container 116 and a mobile manipulator unit 118 with a robotic arm 120. In accordance with at least one embodiment, the mobile container unit 114 may be configured to move one or more containers, like container 116, within the facility for inventory transfer to and from container holders, such as 102 and 104. For example, instructions may be provided via an access point within the facility to the mobile container unit 114 for navigating to a particular container holder to stow inventory within an associated container moved by the mobile container unit 114 to the particular container holder. In other examples, the mobile container unit 114 may move an empty associated container, like container 116, to a portion of container holders within the facility to obtain multiple items of inventory, via the mobile manipulator unit 118. In accordance with at least one embodiment, the mobile container unit 114 may be configured to move one or more containers 116 throughout the facility for inventory transfer or inventory processing.

The workflow 100 includes a transition 122 in the state of the inventory and units 114 and 118 within the facility. The transition 122 of workflow 100 illustrates the mobile manipulator unit 118 transferring 124 a particular item 126 to the container 116 associated with the mobile container unit 114. In accordance with at least one embodiment, the robotic arm 120 of the mobile manipulator unit 118 may be configured to grasp and transfer one or more items of inventory (110 and 126) from a container holder (102 and 104) or a container (106 and 108) from the container holder (102 and 104) within the facility. The mobile manipulator unit 118, via the robotic arm 120, may transfer items of inventory between the container 116 associated with the mobile container unit 114 and the container holders 102 and 104. As described herein, a computer system may transmit instructions to the mobile container unit 114 and mobile manipulator unit 118 for moving to a particular area within the facility and setting up a mobile inventory transfer station near one or more container holders (102 and 104) of the facility. The inventory transfer station is considered mobile because the same mobile container unit 114 and mobile manipulator unit 118 may be present only temporarily in the location near the one or more container holders (102 and 104) for the period of time required to fulfill an order for an item or according to inventory transfer instructions received from the computer system. It should be noted that the mobile container unit 114 and mobile manipulator unit 118 may be utilized to fulfill multiple orders or inventory transfer instructions before moving to a different area of the facility. In embodiments, instructions may be provided to move the mobile container unit 114 to the particular area for setting up the virtual mobile inventory transfer station before instructions are provided to the mobile manipulator unit 118, or instructions may be provided to move the mobile manipulator unit 118 to the particular area for setting up the virtual mobile inventory transfer station before instructions are provided to the mobile container unit 114. In some embodiments, instructions may be provided in real time, subsequently, or in any suitable manner for forming the virtual mobile inventory transfer station. Thus, the mobile inventory transfer stations can provide the benefits of more efficiently fulfilling orders by moving to one or more areas within the facility as required by the inventory transfer instructions and providing more floor space within the facility for use by the container holders or other components of the inventory management system as required.

Figure 2:
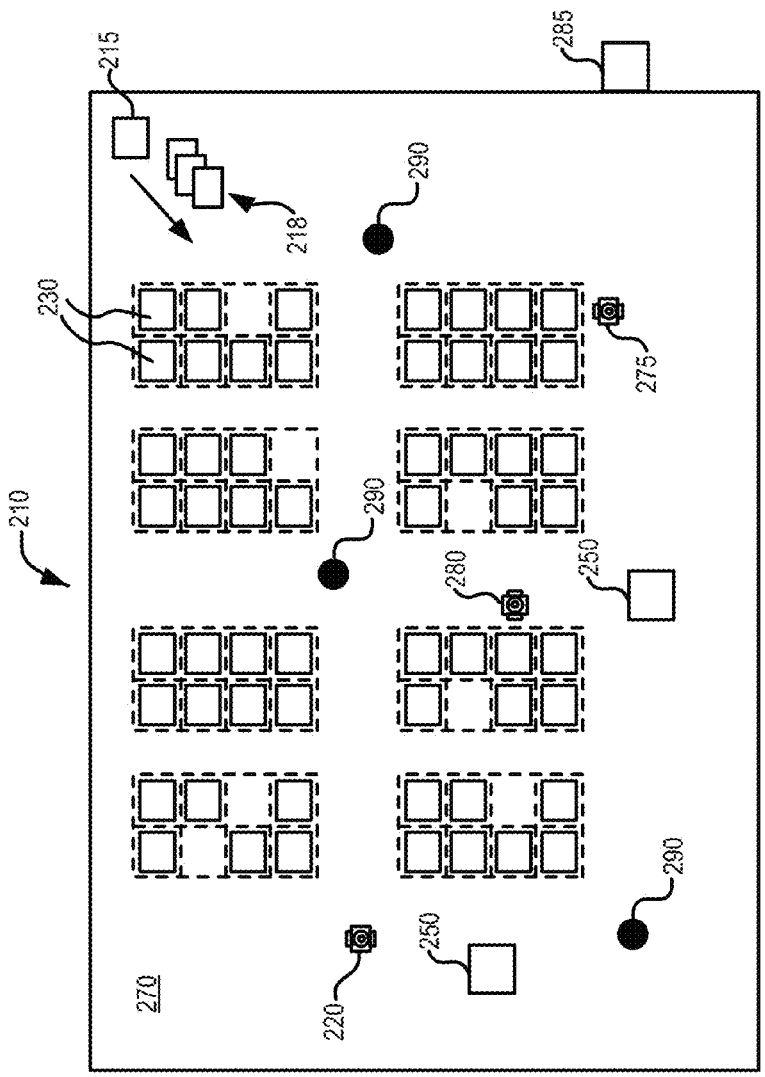
FIG. 2 illustrates components of an inventory management system, in accordance with at least one embodiment.

FIG. 2 illustrates the components of an inventory management system 210. Inventory management system 210 includes a management module 215, one or more mobile drive units 220, one or more inventory holders (container holders) 230, and mobile inventory transfer stations 250. Mobile drive units 220 transport inventory holders 230 between points within a workspace 270 in response to commands communicated by management module 215. Each inventory holder 230 stores one or more types of inventory items. As a result, inventory system 210 is capable of moving inventory items between locations within workspace 270 to facilitate the entry, processing, and/or removal of inventory items from inventory system 210 and the completion of other tasks involving inventory items. The inventory management system 210 includes a mobile container unit 275 and a mobile manipulator unit 280 for transferring inventory within the workspace 270 by forming a mobile inventory transfer station 250 within the workspace 270 as opposed to the inventory station 285. The mobile drive units 220, mobile container unit 275, and mobile manipulator unit 280 may be referred to as "mobile units" 220, 275, and 280 herein.

Management module 215 assigns tasks to appropriate components of inventory management system 210 and coordinates operation of the various components in completing the tasks. These tasks may relate not only to the movement and processing of inventory items, but also to the management and maintenance of the components of inventory management system 210. For example, management module 215 may assign portions of workspace 270 as parking spaces for the mobile units 220, 275, and 280, the scheduled recharge or replacement of mobile unit batteries, the storage of empty inventory holders 230, or any other operations associated with the functionality supported by inventory management system 210 and its various components. Management module 215 may select components of inventory management system 210 to perform these tasks and communicate appropriate commands and/or data to the selected components to facilitate completion of these operations. Although shown in FIG. 2 as a single, discrete component, management module 215 may represent multiple components and may represent or include portions of mobile units 220, 275, and 280, or other elements of inventory management system 210. As a result, any or all of the interactions between a particular mobile unit 220, 275, or 280, and management module 215 that are described herein may, in particular embodiments, represent peer-to-peer communication between that mobile units 220, 275, and 280, and one or more other mobile units 220, 275, and 280. The components and operation of an example embodiment of management module 215 are discussed further below with respect to FIG. 3.

Mobile drive units 220 move inventory holders 230 between locations within workspace 270. Mobile drive units 220 may represent any devices or components appropriate for use in inventory management system 210 based on the characteristics and configuration of inventory holders 230 and/or other elements of inventory management system 210. In a particular embodiment of inventory management system 210, mobile drive units 220 represent independent, self-powered devices configured to freely move about workspace 270. Examples of such inventory systems are disclosed in U.S. Pat. No. 9,087,314, issued on Jul. 21, 2015, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. In alternative embodiments, mobile drive units 220 represent elements of a tracked inventory system configured to move inventory holder 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory management system 210 mobile drive units 220 may be configured to utilize alternative conveyance equipment to move within workspace 270 and/or between separate portions of workspace 270. The components and operation of an example embodiment of a mobile drive unit 220 are discussed further below with respect to FIGS. 4 and 5. In accordance with at least one embodiment, the mobile container unit 275 and mobile manipulator unit 280 may be examples of mobile drive units 220 that are modified for specific tasks associated with the mobile inventory transfer stations described herein.

Additionally, mobile units 220, 275, and 280 may be capable of communicating with management module 215 to receive information identifying selected inventory holders 230, transmit the locations of mobile units 220, 275, and 280, or exchange any other suitable information to be used by management module 215 or mobile units 220, 275, and 280 during operation. Mobile units 220, 275, and 280 may communicate with management module 215 wirelessly, using wired connections between mobile units 220, 275, 280, and management module 215, and/or in any other appropriate manner. As one example, particular embodiments of mobile units 220, 275, and 280 may communicate with management module 215 and/or with one another using 802.11, Bluetooth, or Infrared Data Association (IrDA) standards, or any other appropriate wireless communication protocol. As another example, in a tracked inventory management system 210, tracks or other guidance elements upon which mobile units 220, 275, and 280 move may be wired to facilitate communication between mobile units 220, 275, 280, and other components of inventory management system 210. Furthermore, as noted above, management module 215 may include components of individual mobile units 220, 275, and 280. Thus, for the purposes of this description and the claims that follow, communication between management module 215 and a particular mobile unit 220, 275, and 280 may represent communication between components of a particular mobile unit 220, 275, or 280. In general, mobile units 220, 275, and 280 may be powered, propelled, and controlled in any manner appropriate based on the configuration and characteristics of inventory management system 210.

Inventory holders (container holders) 230 store inventory items. In a particular embodiment, inventory holders 230 include multiple storage bins (containers) with each storage bin capable of holding one or more types of inventory items. Inventory holders 230 are capable of being carried, rolled, and/or otherwise moved by mobile units 220, 275, and 280. In particular embodiments, inventory holder 230 may provide additional propulsion to supplement that provided by mobile units 220, 275, and 280 when moving inventory holder 230.

Additionally, in particular embodiments, inventory items may also hang from hooks or bars (not shown) within or on inventory holder 230. In general, inventory holder 230 may store inventory items in any appropriate manner within inventory holder 230 and/or on the external surface of inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Mobile units 220, 275, or 280 may be configured to rotate inventory holder 230 at appropriate times to present a particular face and the bins associated with that face to an operator, other mobile units 220, 275, 280, or other components of inventory management system 210.

Inventory items represent any objects suitable for storage, retrieval, and/or processing in an automated inventory management system 210. For the purposes of this description, "inventory items" may represent any one or more objects of a particular type that are stored in inventory management system 210. Thus, a particular inventory holder 230 is currently "storing" a particular inventory item if the inventory holder 230 currently holds one or more units of that type. As one example, inventory management system 210 may represent a mail order warehouse facility, and inventory items may represent merchandise stored in the warehouse facility. During operation, mobile units 220, 275, and 280 may retrieve inventory holders 230 containing one or more inventory items requested in an order to be packed for delivery to a customer or inventory holders 230 carrying pallets containing aggregated collections of inventory items for shipment. Moreover, in particular embodiments of inventory management system 210, boxes containing completed orders may themselves represent inventory items.

In particular embodiments, inventory management system 210 may also include one or more mobile inventory transfer stations 250. Mobile inventory transfer stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g. from pallet- or case-sized groups to individual inventory items), the consolidation of inventory items between inventory holders 230, and/or the processing or handling of inventory items in any other suitable manner. In particular embodiments, mobile inventory transfer stations 250 may just represent the physical locations where a particular task involving inventory items can be completed within workspace 270. As described herein, the mobile inventory transfer stations 250 can manifest based on instructions provided by the management module 215 to a mobile drive unit 220, a mobile container unit 275, and a mobile manipulator unit 280 at any location within the workspace 270. Further, the mobile inventory transfer stations 250 can move to other locations within the workspace 270 based on instructions from the management module 215 or may be uninstantiated or be removed from within workspace 270. In alternative embodiments, mobile inventory transfer stations 250 may represent both the physical location and also any appropriate equipment for processing or handling inventory items, such as scanners for monitoring the flow of inventory items in and out of inventory management system 210, communication interfaces for communicating with management module 215, and/or any other suitable components. Mobile inventory transfer stations 250 may be controlled, in part, by human operators or may be fully automated. Moreover, the human or automated operators of mobile inventory transfer stations 250 may be capable of performing certain tasks to inventory items, such as packing, counting, or transferring inventory items, as part of the operation of inventory management system 210. In particular embodiments, inventory management system may include one or more inventory stations 285. Inventory stations 285 represent locations designated for the completion of particular tasks involving inventory items similar to those tasks described above for mobile inventory transfer stations 250. In some examples, the inventory stations 285 represent fixed or immobile locations designated for the completion of particular tasks involving inventory items.

Workspace 270 represents an area associated with inventory management system 210 in which mobile units 220, 275, and 280 can move and/or inventory holders 230 can be stored. For example, workspace 270 may represent all or part of the floor of a mail-order warehouse in which inventory management system 210 operates. Although FIG. 2 shows, for the purposes of illustration, an embodiment of inventory management system 210 in which workspace 270 includes a fixed, predetermined, and finite physical space, particular embodiments of inventory management system 210 may include mobile units 220, 275, 280, and inventory holders 230 that are configured to operate within a workspace 270 that is of variable dimensions and/or an arbitrary geometry. While FIG. 2 illustrates a particular embodiment of inventory management system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile units 220, 275, 280, inventory holders 230, mobile inventory transfer stations 250, inventory stations 285, and other components of inventory management system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests (inventory transfer instructions) that management module 215 receives from other components of inventory management system 210 and/or from external components in communication with management module 215. These inventory requests identify particular operations to be completed involving inventory items stored or to be stored within inventory management system 210 and may represent communication of any suitable form. For example, in particular embodiments, an inventory request may represent a shipping order specifying particular inventory items that have been purchased by a customer and that are to be retrieved from inventory management system 210 for shipment to the customer. Management module 215 may also generate task assignments 218 independently of such inventory requests, as part of the overall management and maintenance of inventory management system 210. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory management system 210. After generating one or more task assignments 218, management module 215 transmits the generated task assignments 218 to appropriate components for completion of the corresponding task. The relevant components then execute their assigned tasks.

Inventory management system 210 includes one or more access points 290 for communicating the tasks generated by the management module 215 to the components of inventory management system 210 including mobile units 220, 275, and 280. The access points 290 located within workspace 270 may aid and enable communication between components of the inventory management system 210 utilizing technologies described herein including 802.11, Bluetooth, or Infrared Data Association (IrDA) standards, or any other appropriate wireless communication protocol. The access points 290 located within workspace 270 may include devices that act as transmitters and receivers of local area wireless network signals (e.g., "Wi-Fi," Long Term Evolution (LTE), Bluetooth, Wireless HD and WiGig, and Z-wave). Examples of inventory management systems and access points are disclosed in U.S. patent application Ser. No. 14/497,110, filed Sep. 25, 2014, titled "WIRELESS VISUALIZATION INTERFACE FOR AUTONOMOUS GROUND VEHICLE SIGNAL COVERAGE." The mobile units 220, 275, and 280 may be configured to utilize an imaging device or scanner for reading fiducial markings located through the inventory management system 210 to aid the management module 215 in determining the location of mobile units 220, 275, and 280 within the inventory management system 210 as is disclosed in U.S. Patent Publication No. 9,087,314, issued on Oct. 2, 2012, titled "SYSTEM AND METHOD FOR POSITIONING A MOBILE DRIVE UNIT," and U.S. Pat. No. 8,280,547, issued on Oct. 2, 2012, titled "METHOD AND SYSTEM FOR TRANSPORTING INVENTORY ITEMS."

In embodiments, the inventory management system 210 may include light emitting elements, such as optical fibers that conduct light from one or more light sources and emit the conducted light at defined physical locations distributed within the inventory management system 210 and workspace 270. The mobile units 220, 275, and 280 may capture an image of one or more of the light emitting elements when moving throughout the inventory management system 210 and workspace 270 and the image may be processed, by the management module 215, to determine the location of the mobile units 220, 275, and 280 within the inventory management system 210 and workspace 270. In an embodiment, the management module 215 implementing the features described herein may utilize a mapping between captured images to light emitting element placements to determine the location of the mobile units 220, 275, and 280, or unique light signal(s) detected at various locations may be utilized to determine the location of the mobile units 220, 275, and 280. In embodiments, the inventory management system 210 may include barcodes, radio frequency identification (RFID) tags, and any other suitable identifiers that are placed throughout the workspace 270 and that may be scanned or read by the mobile units 220, 275, and 280 to determine the location of the mobile units 220, 275, and 280 within the inventory management system 210. For example, unique barcodes may be associated with inventory holders 230. As mobile units 220, 275, and 280 move throughout the workspace 270 an associated scanner may read the barcode and communicate the information contained therein to management module 215 via the access points 290 that can determine the location of the mobile units 220, 275, and 280 based on the scanned barcode. In accordance with at least one embodiment, one or more fiducial markers may be placed throughout the inventory management system 210 and workspace 270 at a distance that an image capture device (such as a camera) can capture an image of the one or more fiducial markers. The fiducial markers may be placed in such a way that a captured image will create a unique combination for each location of the mobile units 220, 275, and 280 within the inventory management system 210 and workspace 270. In embodiments, mobile units 220, 275 and 280 may be configured to utilize an image capture device (such as a camera or digital video recorder) to capture images of inventory being transferred. Data captured by the image capture device may be provided to the management module 215 for determining proper processing of inventory or for performing quality control (identifying missing items from a particular container holder or damaged items).

With respect to mobile units 220, 275, and 280, specifically, management module 215 may, in particular embodiments, communicate task assignments 218 to selected mobile units 220, 275, and 280 that identify one or more destinations for the selected mobile units 220, 275, and 280. Management module 215 may select a mobile unit 220, 275, or 280 to assign the relevant task based on the location or state of the selected mobile unit 220, 275, or 280, an indication that the selected mobile unit 220, 275, or 280 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, may define a temporary location where a mobile inventory transfer station 250 is to be formed, a storage location or default location where the mobile units 220, 275, and 280 should park until receiving another task, or a location associated with any other task appropriate based on the configuration, characteristics, and/or state of inventory management system 210, as a whole, or individual components of inventory management system 210. For example, in particular embodiments, such decisions may be based on the popularity of particular inventory items, the location of particular mobile inventory transfer stations 250, the tasks currently assigned to a particular mobile unit 220, 275, or 280, and/or any other appropriate considerations.

As part of completing these tasks mobile drive units 220 may dock with and transport inventory holders 230 within workspace 270. Mobile drive units 220 may dock with inventory holders 230 by connecting to, lifting, and/or otherwise interacting with inventory holders 230 in any other suitable manner so that, when docked, mobile drive units 220 are coupled to and/or support inventory holders 230 and can move inventory holders 230 within workspace 270. As part of completing the tasks noted herein mobile drive units 220 may dock with inventory holders 230 by connecting to, lifting, going underneath, and/or otherwise interacting with inventory holders 230 in any other suitable manner so that, when docked, mobile manipulator units 280 can transfer inventory between the inventory holders 230 and/or the mobile container units 275, as described herein. In some embodiments, the mobile container unit 275 may perform the tasks noted herein without docking and/or connecting to the inventory holders 230. For example, the mobile container unit 275 may reside in a location near the inventory holders 230 while the mobile manipulator unit 280 transfers inventory between the two.

As part of completing the tasks noted herein, the mobile manipulator unit 280 may dock with inventory holders 230 by connecting to, lifting, going underneath, and/or otherwise interacting with inventory holders 230 in any other suitable manner to transfer inventory between the inventory holders 230 and the mobile container unit 275. In some embodiments, the mobile manipulator unit 280 may perform the tasks noted herein without docking and/or connecting to the inventory holders 230. For example, the mobile manipulator unit 280 may reside or be temporarily located within a distance of a particular container holder 230 and a mobile container unit 275 for transferring inventory. In embodiments, the mobile units 220, 275, 280, and inventory holder 230 may be configured to interact in any manner suitable to allow mobile units 220, 275, and 280 to transfer inventory within workspace 270. Additionally, as noted herein, in particular embodiments, mobile drive units 220 represent all or portions of inventory holders 230. In such embodiments, mobile drive units 220 may not dock with inventory holders 230 before transporting inventory holders 230 and/or mobile drive units 220 may each remain continually docked with a particular inventory holder 230. In some embodiments, the mobile manipulator unit 280 may remain continually docked with a particular inventory holder 230 or a portion of inventory holders 230.

While the appropriate components of inventory management system 210 complete assigned tasks, management module 215 may interact with the relevant components to ensure the efficient use of space, equipment, manpower, and other resources available to inventory management system 210. As one specific example of such interaction, management module 215 is responsible, in particular embodiments, for planning the paths mobile units 220, 275, and 280 take when moving within workspace 270 and for allocating use of a particular portion of workspace 270 to a particular mobile unit(s) 220, 275, and 280 for purposes of completing an assigned task. In such embodiments, mobile units 220, 275, and 280 may, in response to being assigned a task, request a path to a particular destination associated with the task. Moreover, while the description herein focuses on one or more embodiments in which mobile units 220, 275, and 280 requests paths from management module 215, mobile units 220, 275, and 280 may, in alternative embodiments, generate their own paths.

Components of inventory management system 210 may provide information to management module 215 regarding their current state, other components of inventory management system 210 with which they are interacting, and/or other conditions relevant to the operation of inventory management system 210 including locations of components of inventory management system 210 within the workspace 270. This may allow management module 215 to utilize feedback from the relevant components to update algorithm parameters, adjust policies, or otherwise modify its decision-making to respond to changes in operating conditions or the occurrence of particular events.

In addition, while management module 215 may be configured to manage various aspects of the operation of the components of inventory management system 210, in particular embodiments, the components themselves may also be responsible for decision-making relating to certain aspects of their operation, thereby reducing the processing load on management module 215.

Thus, based on its knowledge of the location, current state, and/or other characteristics of the various components of inventory management system 210 and an awareness of all the tasks currently being completed, management module 215 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory management system 210 may be able to support a number of techniques for efficiently executing various aspects of the operation of inventory management system 210. As a result, particular embodiments of management module 215 may, by implementing one or more techniques described herein, enhance the efficiency of inventory management system 210 and/or provide other operational benefits.

Figure 3:
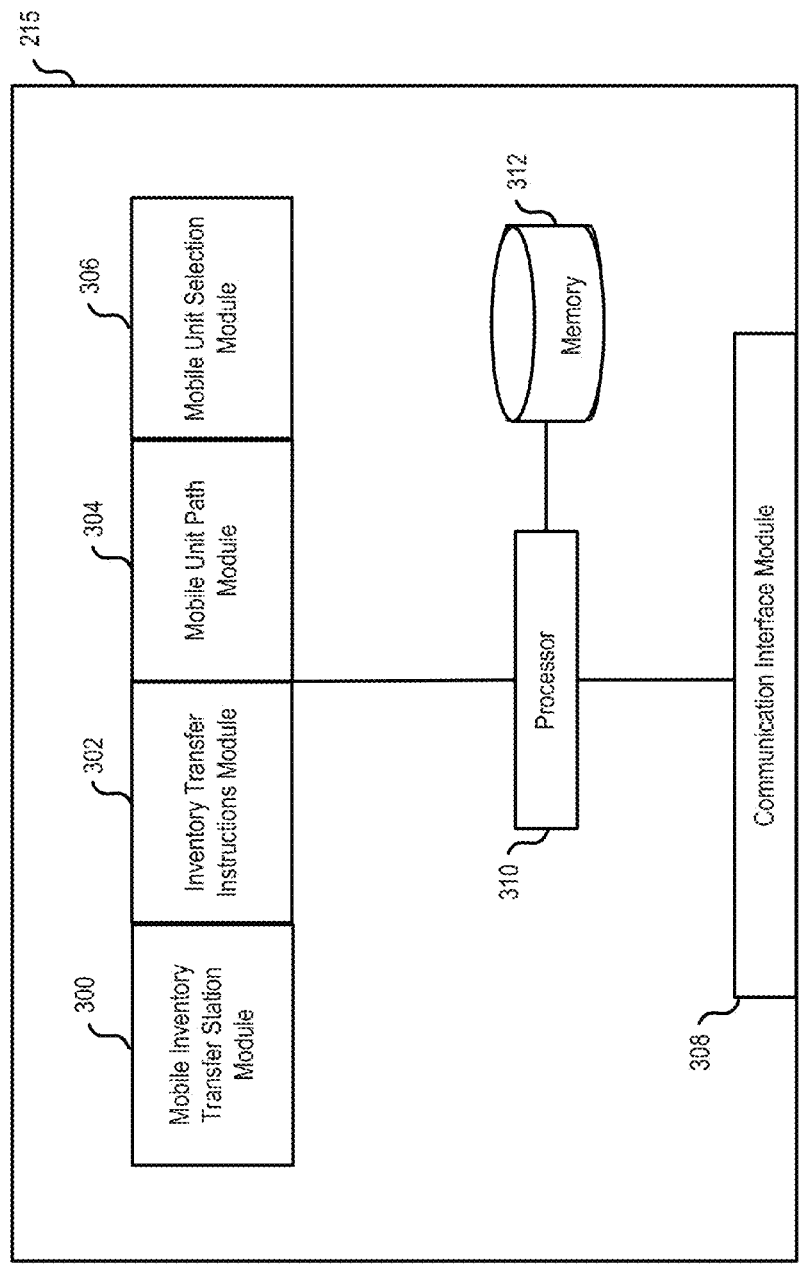
FIG. 3 illustrates in greater detail the components of an example management module that may be utilized in particular embodiments of the inventory management system shown in FIG. 2.

FIG. 3 illustrates in greater detail the components of an example management module 215 that may be utilized in particular embodiments of the inventory management system shown in FIG. 2. As shown, the example embodiment includes a mobile inventory transfer station module 300, an inventory transfer instructions module 302, a mobile unit path module 304, a mobile unit selection module 306, a communication interface module 308, a processor 310, and memory 312. Management module 215 may represent a single component, multiple components located at a central location within inventory management system 210, or multiple components distributed throughout inventory management system 210. For example, management module 215 may represent components of one or more mobile units 220, 275, and 280 that are capable of communicating information between the mobile units 220, 275, 280, and coordinating the movement of mobile units 220, 275, and 280 within workspace 270. In general, management module 215 may include any appropriate combination of hardware and/or software suitable to provide the described functionality.

Processor 310 is operable to execute instructions associated with the functionality provided by management module 215. Processor 310 may comprise one or more general purpose computers, dedicated microprocessors, or other processing devices capable of communicating electronic information. Examples of processor 310 include one or more application-specific integrated circuits (ASICs), field programmable gate arrays (FPGAs), digital signal processors (DSPs), and any other suitable specific or general purpose processors.

Memory 312 stores processor instructions, inventory transfer requests, inventory requests, reservation information, state information for the various components of inventory management system 210, and/or any other appropriate values, parameters, or information utilized by management module 215 during operation. Memory 312 may represent any collection and arrangement of volatile or nonvolatile, local or remote devices suitable for storing data. Examples of memory 312 include, but are not limited to, random access memory (RAM) devices, read only memory (ROM) devices, magnetic storage devices, optical storage devices or any other suitable data storage devices.

Mobile inventory transfer station module 300 may be configured to identify or select an area of the workspace 270 of an inventory management system 210 for forming a mobile inventory transfer station. In embodiments, the area identified or selected can include one or more container holders and an associated space around the container holders in which the mobile drive unit, the mobile container unit, and the mobile manipulator unit may operate while transferring inventory within the workspace 270. The mobile inventory transfer station module 300 may be configured to generate tasks for implementation and completion by components of the inventory management system 210 as described herein. The mobile inventory transfer station module 300 may communicate the assigned tasks to the appropriate components utilizing communication interface 308. In accordance with at least one embodiment, the mobile inventory transfer station module 300 may maintain information that identifies the locations of one or more mobile inventory transfer stations within a workspace 270. The mobile inventory transfer station module 300 may maintain the information identifying the location of a mobile inventory transfer station for as long as the station is instantiated and upon de-instantiation may update the information removing the location for that particular station. The mobile inventory transfer station module 300 may transmit instructions to mobile units that are selected for fulfilling inventory transfer instructions based at least in part on input from the mobile unit selection module 306.

The inventory transfer instructions module 302 may be configured to receive and maintain one or more instructions for transferring inventory to, from, and within the inventory management system 210. The inventory transfer instructions module 302 may track inventory as it is processed according to the inventory transfer instructions until the transfer is complete or leaves the workspace 270. In embodiments, the inventory transfer instructions module 302 may be configured to assign a number of associated containers for a mobile container unit to move within the inventory management system 210. For example, inventory transfer instructions may require a single mobile container unit, for efficiency purposes, to obtain and move multiple containers to a particular area of the workspace 270 for fulfilling the inventory transfer instructions or a customer order. The inventory transfer instructions module 302 may be configured to re-assign a mobile container unit upon completion of a stow operation for a pick operation within the inventory management system 210 based on feedback and input from the components of inventory management system 210. In accordance with at least one embodiment, the inventory transfer instructions module 302 may identify the required items of inventory for fulfilling a customer order or inventory transfer instructions based at least in part on maintained information that identifies which container holders are associated with or store which particular items of inventory. The inventory transfer instructions module 302 maintains information about the location and number of inventory items in the inventory management system 210. Information can be maintained about the number of inventory items in a particular inventory holder 230, and the maintained information can include the location of those inventory items in the inventory holder 230. The inventory transfer instructions module 302 can also communicate with the mobile units, utilizing task assignments to maintain, replenish, or move inventory items within the inventory management system 210.

The mobile unit path module 304 may be configured determine particular paths or generate instructions indicating paths for the mobile units to follow when transferring inventory within the inventory management system. For example, a particular path may be generated and transmitted to a mobile container unit for navigating between a portion of inventory holders 230 to fulfill a customer order or to transfer inventory according to inventory transfer instructions. In embodiments, a different path may be generated by the mobile unit path module 304 and transmitted to a selected mobile manipulator unit for transferring inventory to the mobile container unit according to inventory transfer instructions or to fulfill a customer order for items of inventory. In some examples, a generated path may be suitable for both the mobile container unit and mobile manipulator unit to navigate between inventory holders 230 or the workspace 270. In embodiments, the mobile unit path module 304 may be configured to generate and transmit instructions to particular mobile units to move underneath, below, around, or above, inventory holders 230 within the workspace 270 to create clear paths for other mobile units to navigate the workspace 270.

The mobile unit path module 304 may transmit instructions to one or more mobile units within the inventory management system 210 for blocking certain portions of the workspace (such as by forming a line between one or more inventory holders 230 within the workspace 270) to prevent a human operator from taking a particular path in the workspace 270. The same blocking mechanism may be utilized to avoid mobile unit paths from crossing human operator paths or potential paths within the workspace 270. Additionally, mobile unit path module 304 may receive route requests from the mobile units (220, 275, 280). These route requests may identify one or more destinations associated with a task the requesting mobile unit is executing. In response to receiving a route request, mobile unit path module 304 generates a path to one or more destinations identified in the route request. Mobile unit path module 304 may implement any appropriate algorithms utilizing any appropriate parameters, factors, and/or considerations to determine the appropriate path. After generating an appropriate path, mobile unit path module 304 transmits a route response identifying the generated path to the requesting mobile unit using communication interface module 308. Mobile unit path module 304 may receive reservation requests from mobile units attempting to move along paths generated by the mobile unit path module 304. These reservation requests request the use of a particular portion of workspace 270 (referred to herein as a "segment") to allow the requesting mobile unit to avoid collisions with other mobile units while moving across the reserved segment. In response to received reservation requests, the mobile unit path module 304 may transmit a reservation response granting or denying the reservation request to the requesting mobile unit using the communication interface module 308.

The mobile unit selection module 306 may be configured to select an appropriate mobile drive unit, mobile container unit, and mobile manipulator unit for forming a mobile inventory transfer station as described herein. In embodiments, the mobile unit selection module 306 may be configured to select the appropriate mobile units based at least in part on current locations of the mobile units and the distance from the current locations to a different location required to fulfill a customer order or inventory transfer instructions. The distance may be the distance between the mobile units and the area of interest or temporary location for the mobile inventory transfer station within the workspace. The mobile unit selection module 306 may be configured to maintain one or more default locations or resting locations for the mobile units within the inventory management system 210 to reside when not performing a task generated by the management module 215. In embodiments, the mobile unit selection module 306 may be configured to generate and transmit a user interface or user interface components for presentation on a computing device that enables a user to provide input. The input may be utilized by the mobile unit selection module 306 and communication interface module 308 to aid a robotic arm associated with a mobile manipulator unit in grasping items of inventory to fulfill a customer order or inventory transfer instructions via teleoperation. Additionally, mobile unit selection module 306 may also be responsible for generating assigned tasks associated with various management operations, such as prompting mobile units to recharge batteries or have batteries replaced, instructing inactive mobile units to park in a location outside the anticipated traffic flow or a location near the anticipated site of future tasks, and/or directing mobile units selected for repair or maintenance to move towards a designated maintenance station within the inventory management system 210.

Communication interface module 308 facilitates communication between management module 215 and other components of inventory management system 210, including reservation responses, reservation requests, route requests, route responses, and task assignments. These reservation responses, reservation requests, route requests, route responses, and task assignments may represent communication of any form appropriate based on the capabilities of management module 215 and may include any suitable information. Depending on the configuration of management module 215, communication interface module 308 may be responsible for facilitating either or both of wired and wireless communication between management module 215 and the various components of inventory management system 210. In embodiments, communication interface module 308 may facilitate communication between management module 215 and other parts of the same system component.

In general, mobile inventory transfer station module 300, inventory transfer instructions module 302, mobile unit path module 304, mobile unit selection module 306, and communication interface module 308 may each represent any appropriate hardware and/or software suitable to provide the described functionality. In addition, as noted above, management module 215 may, in particular embodiments, represent multiple different discrete components and any or all of mobile inventory transfer station module 300, inventory transfer instructions module 302, mobile unit path module 304, mobile unit selection module 306, and communication interface module 308 may represent components physically separate from the remaining elements of management module 215. Moreover, any two or more of mobile inventory transfer station module 300, inventory transfer instructions module 302, mobile unit path module 304, mobile unit selection module 306, and communication interface module 308 may share common components. For example, in particular embodiments, mobile inventory transfer station module 300, inventory transfer instructions module 302, mobile unit path module 304, mobile unit selection module 306, and communication interface module 308 may share a wireless transmitter, a wireless receiver, and a related computer process executing on processor 310.

Figure 4:
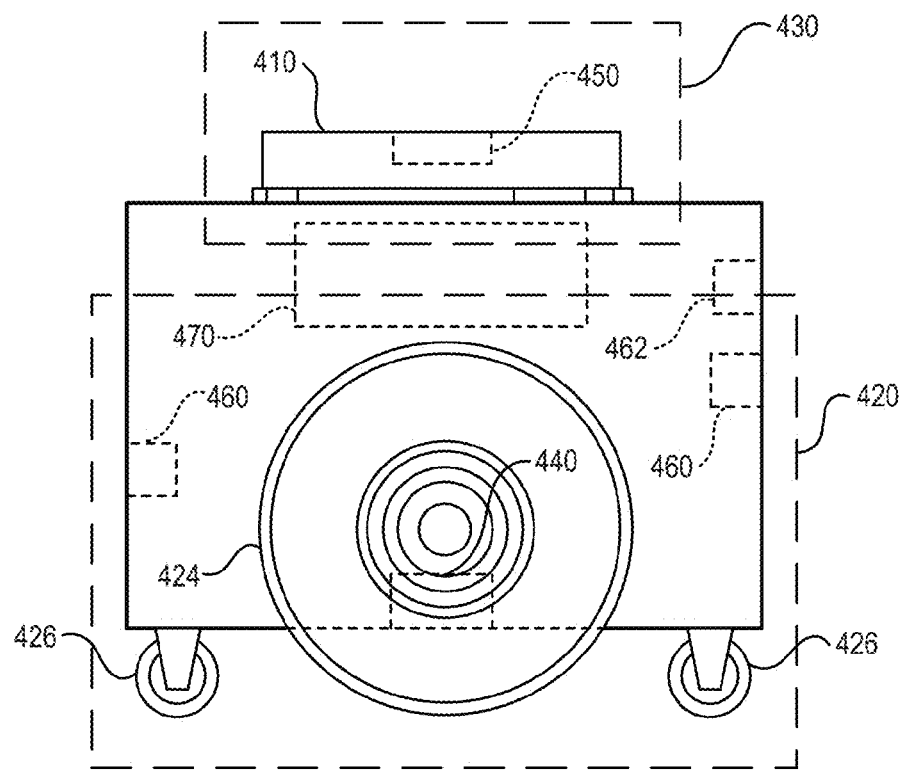
FIGS. 4 and 5 illustrate in greater detail an example mobile drive unit that may be utilized in particular embodiments of the inventory management system shown in FIG. 2.
Figure 5:
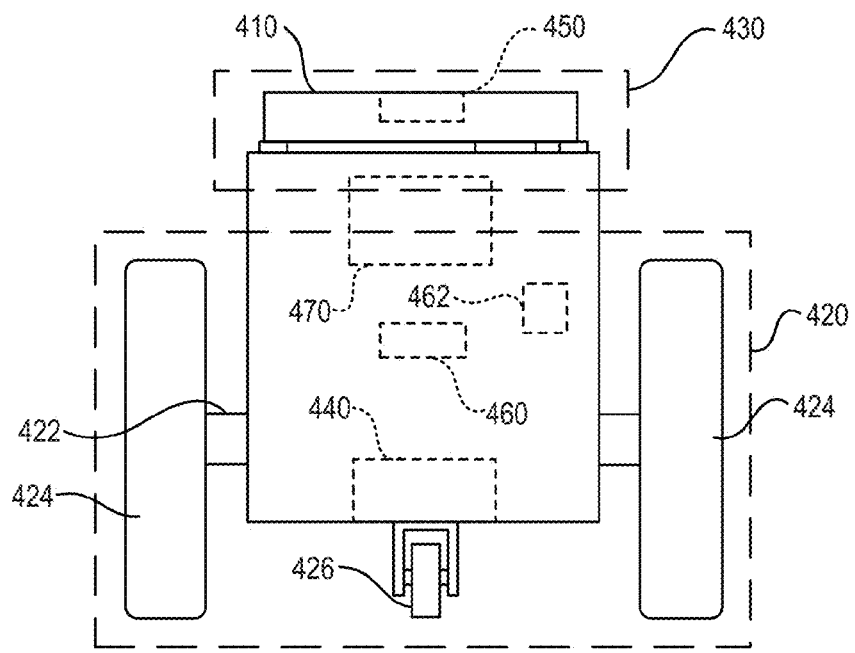

FIGS. 4 and 5 illustrate in greater detail the components of a particular embodiment of mobile drive unit 220. In particular, FIGS. 4 and 5 include a front and side view of an example mobile drive unit 220. As described herein, the mobile drive unit 220 may be an example of a mobile container unit or a mobile manipulator unit, or the mobile container unit and mobile manipulator unit may be comprised of a modified mobile drive unit 220. For example, the modified mobile drive unit 220 may include one or more robotic arms for transferring inventory or platforms for moving containers. Mobile drive unit 220 includes a docking head 410, a drive module 420, a docking actuator 430, and a control module 470. Additionally, mobile drive unit 220 may include one or more sensors configured to detect or determine the location of mobile drive unit 220, inventory holder 230, and/or other appropriate elements of inventory management system 210. In the illustrated embodiment, mobile drive unit 220 includes a position sensor 440, a holder sensor 450, an obstacle sensor 460, and an identification signal transmitter 462.

Docking head 410, in particular embodiments of mobile drive unit 220, couples mobile drive unit 220 to inventory holder 230 and/or supports inventory holder 230 when mobile drive unit 220 is docked to inventory holder 230. Docking head 410 may additionally allow mobile drive unit 220 to maneuver inventory holder 230, such as by lifting inventory holder 230, propelling inventory holder 230, rotating inventory holder 230, and/or moving inventory holder 230 in any other appropriate manner. Docking head 410 may also include any appropriate combination of components, such as ribs, spikes, and/or corrugations, to facilitate such manipulation of inventory holder 230. For example, in particular embodiments, docking head 410 may include a high-friction portion that abuts a portion of inventory holder 230 while mobile drive unit 220 is docked to inventory holder 230. In such embodiments, frictional forces created between the high-friction portion of docking head 410 and a surface of inventory holder 230 may induce translational and rotational movement in inventory holder 230 when docking head 410 moves and rotates, respectively. As a result, mobile drive unit 220 may be able to manipulate inventory holder 230 by moving or rotating docking head 410, either independently or as a part of the movement of mobile drive unit 220 as a whole.

Drive module 420 propels mobile drive unit 220 and, when mobile drive unit 220 and inventory holder 430 are docked, inventory holder 230. Drive module 420 may represent any appropriate collection of components operable to propel mobile drive unit 220. For example, in the illustrated embodiment, drive module 420 includes motorized axle 422, a pair of motorized wheels 424, and a pair of stabilizing wheels 426. One motorized wheel 424 is located at each end of motorized axle 422, and one stabilizing wheel 426 is positioned at each end of mobile drive unit 220.

Docking actuator 430 moves docking head 410 towards inventory holder 230 to facilitate docking of mobile drive unit 220 and inventory holder 230. Docking actuator 430 may also be capable of adjusting the position or orientation of docking head 410 in other suitable manners to facilitate docking. Docking actuator 430 may include any appropriate components, based on the configuration of mobile drive unit 220 and inventory holder 230, for moving docking head 410 or otherwise adjusting the position or orientation of docking head 410. For example, in the illustrated embodiment, docking actuator 430 includes a motorized shaft (not shown) attached to the center of docking head 410. The motorized shaft is operable to lift docking head 410 as appropriate for docking with inventory holder 230.

Drive module 420 may be configured to propel mobile drive unit 220 in any appropriate manner. For example, in the illustrated embodiment, motorized wheels 424 are operable to rotate in a first direction to propel mobile drive unit 220 in a forward direction. Motorized wheels 424 are also operable to rotate in a second direction to propel mobile drive unit 220 in a backward direction. In the illustrated embodiment, drive module 420 is also configured to rotate mobile drive unit 220 by rotating motorized wheels 424 in different directions from one another or by rotating motorized wheels 424 at different speeds from one another.

Position sensor 440 represents one or more sensors, detectors, or other components suitable for determining the location of mobile drive unit 220 in any appropriate manner. For example, in particular embodiments, the workspace 270 associated with inventory management system 210 includes a number of fiducial marks that mark points on a two-dimensional grid that covers all or a portion of workspace 270. In such embodiments, position sensor 440 may include a camera and suitable image- and/or video-processing components, such as an appropriately-programmed digital signal processor, to allow position sensor 440 to detect fiducial marks within the camera's field of view. Control module 470 may store location information that position sensor 440 updates as position sensor 440 detects fiducial marks. As a result, position sensor 440 may utilize fiducial marks to maintain an accurate indication of the location mobile drive unit 220 and to aid in navigation when moving within workspace 270.

Holder sensor 450 represents one or more sensors, detectors, or other components suitable for detecting inventory holder 230 and/or determining, in any appropriate manner, the location of inventory holder 230, as an absolute location or as a position relative to mobile drive unit 220. Holder sensor 450 may be capable of detecting the location of a particular portion of inventory holder 230 or inventory holder 230 as a whole. Mobile drive unit 220 may then use the detected information for docking with or otherwise interacting with inventory holder 230.

Obstacle sensor 460 represents one or more sensors capable of detecting objects located in one or more different directions in which mobile drive unit 220 is capable of moving. Obstacle sensor 460 may utilize any appropriate components and techniques, including optical, radar, sonar, pressure-sensing and/or other types of detection devices appropriate to detect objects located in the direction of travel of mobile drive unit 220. In particular embodiments, obstacle sensor 460 may transmit information describing objects it detects to control module 470 to be used by control module 470 to identify obstacles and to take appropriate remedial actions to prevent mobile drive unit 220 from colliding with obstacles and/or other objects.

Obstacle sensor 460 may also detect signals transmitted by other mobile drive units 220 operating in the vicinity of the illustrated mobile drive unit 220. For example, in particular embodiments of inventory management system 210, one or more mobile drive units 220 may include an identification signal transmitter 462 that transmits a drive identification signal. The drive identification signal indicates to other mobile drive units 220 that the object transmitting the drive identification signal is in fact a mobile drive unit. Identification signal transmitter 462 may be capable of transmitting infrared, ultraviolet, audio, visible light, radio, and/or other suitable signals that indicate to recipients that the transmitting device is a mobile drive unit 220.

Additionally, in particular embodiments, obstacle sensor 460 may also be capable of detecting state information transmitted by other mobile drive units 220. For example, in particular embodiments, identification signal transmitter 462 may be capable of including state information relating to mobile drive unit 220 in the transmitted identification signal. This state information may include, but is not limited to, the position, velocity, direction, and the braking capabilities of the transmitting mobile drive unit 220. In particular embodiments, mobile drive unit 220 may use the state information transmitted by other mobile drive units to avoid collisions when operating in close proximity with those other mobile drive units.

Control module 470 monitors and/or controls operation of drive module 420 and docking actuator 430. Control module 470 may also receive information from sensors such as position sensor 440 and holder sensor 450 and adjust the operation of drive module 420, docking actuator 430, and/or other components of mobile drive unit 220 based on this information. Additionally, in particular embodiments, mobile drive unit 220 may be configured to communicate with a management device of inventory management system 210 and control module 470 may receive commands transmitted to mobile drive unit 220 and communicate information back to the management device utilizing appropriate communication components of mobile drive unit 220. Control module 470 may include any appropriate hardware and/or software suitable to provide the described functionality. In particular embodiments, control module 470 includes a general-purpose microprocessor programmed to provide the described functionality. Additionally, control module 470 may include all or portions of docking actuator 430, drive module 420, position sensor 440, and/or holder sensor 450, and/or share components with any of these elements of mobile drive unit 220.

Moreover, in particular embodiments, control module 470 may include hardware and software located in components that are physically distinct from the device that houses drive module 420, docking actuator 430, and/or the other components of mobile drive unit 220 described above. For example, in particular embodiments, each mobile drive unit 220 operating in inventory management system 210 may be associated with a software process (referred to here as a "drive agent") operating on a server that is in communication with the device that houses drive module 420, docking actuator 430, and other appropriate components of mobile drive unit 220. This drive agent may be responsible for requesting and receiving tasks, requesting and receiving routes, transmitting state information associated with mobile drive unit 220, and/or otherwise interacting with management module 215 and other components of inventory management system 210 on behalf of the device that physically houses drive module 420, docking actuator 430, and the other appropriate components of mobile drive unit 220. As a result, for the purposes of this description and the claims that follow, the term "mobile drive unit, mobile container unit, and mobile manipulator unit" includes software and/or hardware, such as agent processes, that provides the described functionality on behalf of mobile drive unit 220 but that may be located in physically distinct devices from the drive module 420, docking actuator 430, and/or the other components of mobile drive unit 220 described above.

While FIGS. 4 and 5 illustrate a particular embodiment of mobile drive unit 220 containing certain components and configured to operate in a particular manner, mobile drive unit 220 may represent any appropriate component and/or collection of components configured to transport and/or facilitate the transport of inventory holders 230. As another example, mobile drive unit 220 may represent part of an overhead crane system in which one or more crane assemblies are capable of moving within a network of wires or rails to a position suitable to dock with a particular inventory holder 230. After docking with inventory holder 230, the crane assembly may then lift inventory holder 230 and move inventory to another location for purposes of completing an assigned task.

Furthermore, in particular embodiments, mobile drive unit 220 may represent all or a portion of inventory holder 230. Inventory holder 230 may include motorized wheels or any other components suitable to allow inventory holder 230 to propel itself. As one specific example, a portion of inventory holder 230 may be responsive to magnetic fields. Inventory management system 210 may be able to generate one or more controlled magnetic fields capable of propelling, maneuvering and/or otherwise controlling the position of inventory holder 230 as a result of the responsive portion of inventory holder 230. In such embodiments, mobile drive unit 220 may generate the controlled magnetic fields that affect the responsive portion of inventory holder 230 and/or the components of inventory management system 210 responsible for generating and controlling these magnetic fields. While this description provides several specific examples, mobile drive unit 220 may, in general, represent any appropriate component and/or collection of components configured to transport and/or facilitate the transport of inventory holders 230.

Figure 6:
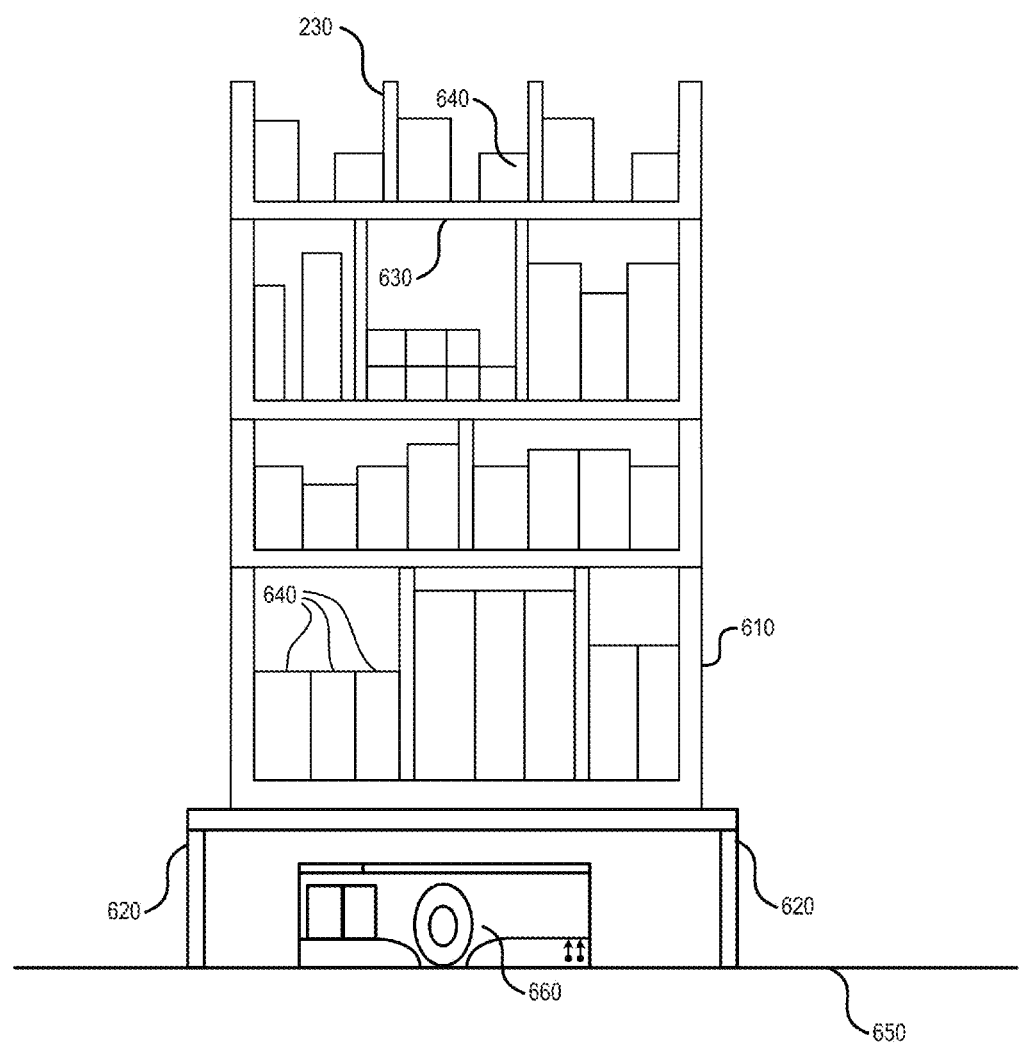
FIG. 6 illustrates in greater detail an example inventory holder that may be utilized in particular embodiments of the mobile inventory transfer station within an inventory management system, in accordance with at least one embodiment.

FIG. 6 illustrates in greater detail an example inventory holder that may be utilized in particular embodiments of the mobile inventory transfer station within an inventory management system, in accordance with at least one embodiment. In particular, FIG. 6 illustrates the structure and contents of one side of an example inventory holder 230. In a particular embodiment, inventory holder 230 may comprise any number of faces with similar or different structure. As illustrated, inventory holder 230 includes a frame 610, a plurality of legs 620, and one or more shelves 630 for storing inventory in containers 640 of various sizes. Although FIG. 6 illustrates the inventory holder 230 storing inventory in containers 640, embodiments described herein include the inventory holder 230 storing inventory that is not in containers 640. In some configurations for inventory holders 230, the plurality of legs 620 are situated in such a way as to place the frame 610 above a surface 650 of a workspace 270.

The frame 610 of the inventory holder 230 may rest a variable height above the surface 650 of the workspace 270 to allow for one or more mobile units (220, 275, 280), such as mobile unit 660 to move underneath. For example, in response to instructions from the management module 215, the mobile unit 660 may move below or underneath the inventory holder 230 to free up space or clear a path for a human operator or other mobile unit to move past the inventory holder 230 within the workspace 270. In embodiments, the mobile unit 660 may include a mobile manipulator unit and the associated robotic arm may be configured to collapse for temporary storage with the mobile unit 660 underneath the inventory holder 230. In accordance with at least one embodiment, the configuration of the inventory holder 230, frame 610, and plurality of legs 620 may be such that one or more mobile units 660 may be temporarily stored underneath or travel from one point to another in the workspace by traveling underneath the inventory holder 230. Instructions provided by the management module 215 may result in any mobile units 660 temporarily stored or parked underneath the inventory holder 230 moving out from underneath and continuing along a path according to a generated task or waiting idly by the inventory holder 230 until a task is communicated.

Figure 7:
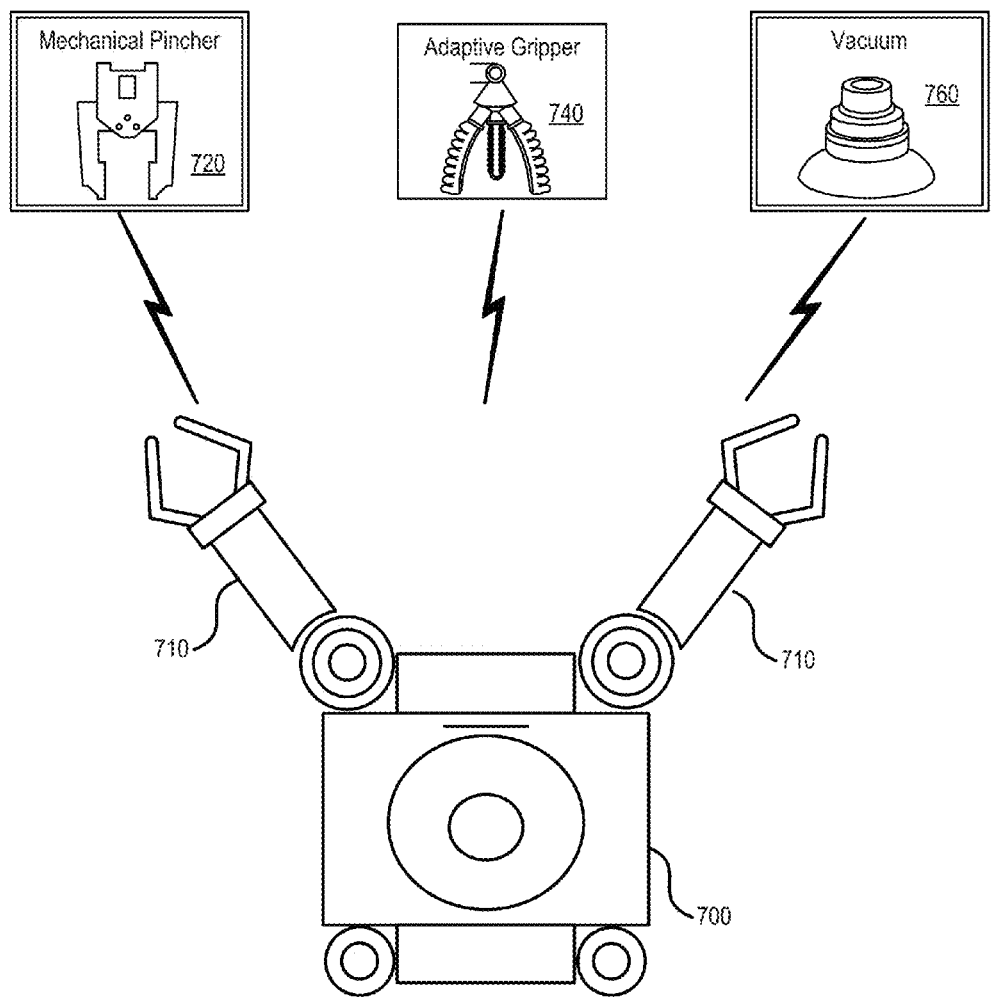
FIG. 7 illustrates an example mobile manipulator unit and various end of arm tools that may be utilized by the mobile manipulator unit to transfer inventory within the inventory management system, in accordance with at least one embodiment.

FIG. 7 illustrates an example mobile manipulator unit and various end of arm tools that may be utilized by the mobile manipulator unit to transfer inventory within the inventory management system, in accordance with at least one embodiment. FIG. 7 includes an example mobile manipulator unit 700 with associated robotic arms 710 and a plurality of end of arm tools 720-760 for grasping inventory for transfer as described herein. In embodiments, each robotic arm 710 may be configured to utilize a particular end of arm tool, a mix of end of arm tools, or a plurality of end of arm tools 720-760. The end of arm tools may allow the mobile manipulator unit to grasp inventory items that are stored in containers of the inventory holders 230 or to grasp inventory that is loosely stored without packaging in inventory holders 230. The robotic arms may facilitate the movement of inventory items and other features of the inventory management system 210 among and between components of the inventory management system 210. The end of arm tools illustrated in FIG. 7 include a mechanical pincher 720, an adaptive gripper tool 740, and a vacuum tool 760. In embodiments, various combinations of the end of arm tools 720-760 may be utilized to grasp and transfer inventory. In an embodiment, a particular end of arm tool may be combined with another end of arm tool to be utilized on a single robotic arm. For example, the mechanical pincher 720 and vacuum tool 760 may be configured to work in combination to grasp and transfer inventory.

The robotic arms 710 may be controlled, based on instructions from the management module 215 or from a human operator, so as to grasp items in a manner particularly suited for grasping of a target item. For example, a target item, or characteristics thereof, may be identified, such as by optical or other sensors, in order to determine a grasping strategy for the item. The grasping strategy may be generated by the management module 215 based at least in part upon a database containing information about the item, characteristics of the item, and/or similar items, such as information indicating grasping strategies that have been successful or unsuccessful for such items in the past. Entries or information in the database may be originated and/or updated based on human input for grasping strategies, determined characteristics of a particular item, and/or machine learning related to grasping attempts of other items sharing characteristics with the particular item. It should be noted that although some end of arm tools (720-760) are included in FIG. 7, any suitable end of arm tool or end effectors may be utilized for grasping items and transferring the items according to inventory transfer embodiments described herein. Further, the mobile manipulator unit 700 may be configured to utilize as few as one robotic arm 710 or multiple (two or more)

robotic arms 710 for transferring inventory within the inventory management system 210.

Figure 8:
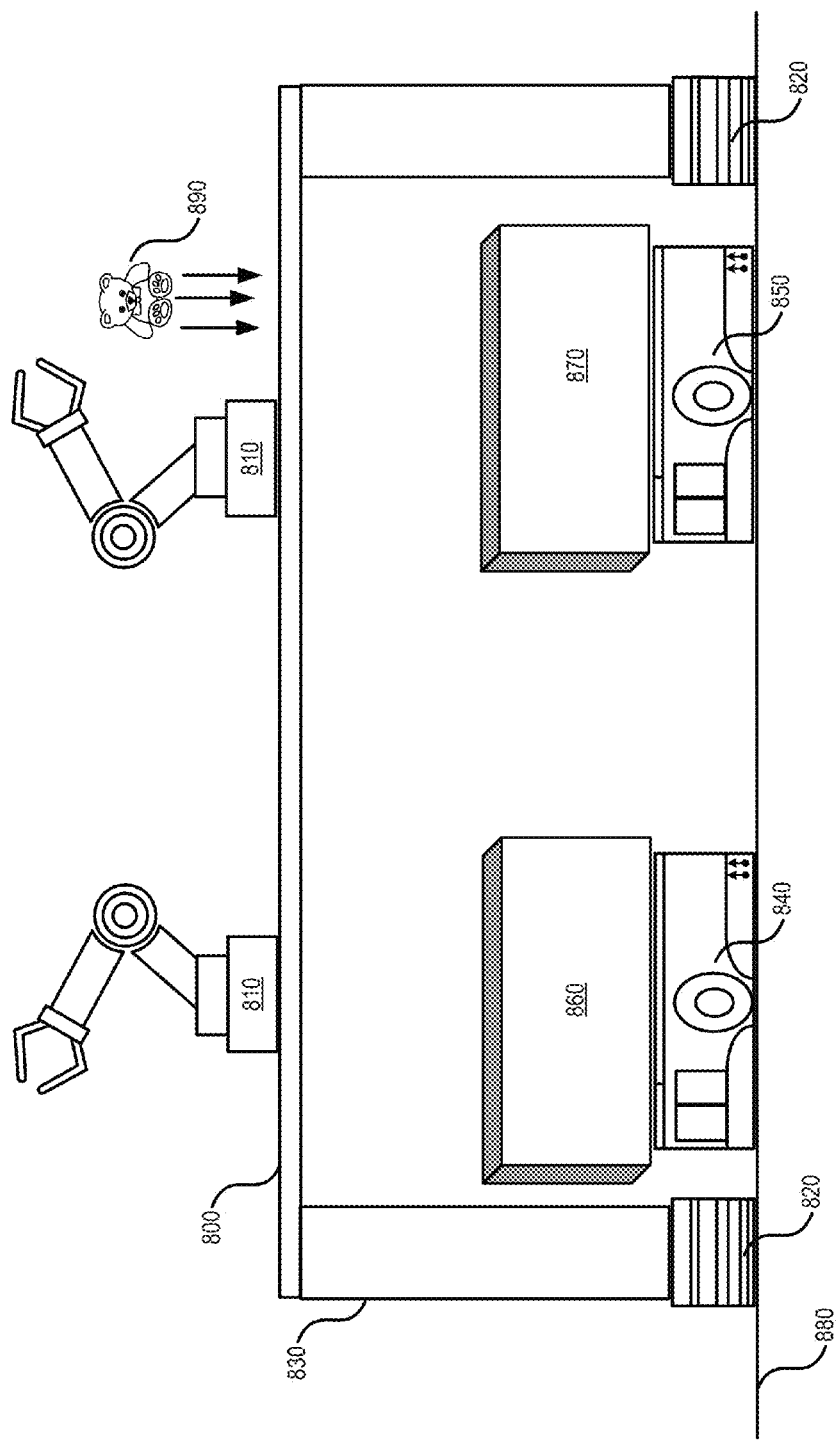
FIG. 8 illustrates an example configuration for a mobile manipulator unit and mobile container units transferring inventory within an inventory management system, in accordance with at least one embodiment.

FIG. 8 illustrates an example configuration for a mobile manipulator unit and mobile container units transferring inventory within an inventory management system, in accordance with at least one embodiment. FIG. 8 includes an example configuration for a mobile manipulator unit 800 comprised of robotic arms 810, treads 820, and legs 830. As described herein, the robotic arms 810 may be utilized by the mobile manipulator unit 800 to transfer inventory to one or more mobile container units (840 and 850) and their associated containers (860 and 870). The treads 820 may allow the mobile manipulator unit 800 to move along a surface 880 within the workspace 270 for transferring inventory between inventory holders 230 and containers 860 and 870. The illustrated configuration for mobile manipulator unit 800 included in FIG. 8 may allow for one or more mobile container units 840 and 850 to travel underneath or below the mobile manipulator unit 800 while transferring inventory, such as item 890, within the workspace 270. For example, as mobile container unit 850 travels underneath the mobile manipulator unit 800, the robotic arms 810 may grasp item 890 and transfer the item to the container 870 as part of a task to fulfill a customer order or according to inventory transfer instructions provided by the management module 215.

The example configuration illustrated in FIG. 8 allows for movement of one or more mobile container units 840 and 850 through the workspace 270, such as by navigating between a portion of inventory holders 230, while maximizing the floor space and avoiding a traffic build up within the workspace 270. In accordance with at least one embodiment, the management module 215 may generate and transmit instructions to the mobile manipulator unit 800 and mobile container units 840 and 850 to maintain a certain velocity within the workspace 270 while fulfilling customer orders or transferring inventory according to inventory transfer instructions. For example, the management module 215 may identify the location of the mobile units (800, 840, and 850), and transmit particular paths for the mobile units (800, 840, and 850) to follow at a certain velocity. The robotic manipulator 800 may be configured to identify the items of inventory (890) required to be transferred to or from inventory holders 230 and/or the containers 860 and 870 while moving through the workspace 270 without stopping. The management module 215 may provide instructions to stop or reduce speed based on feedback or input provided by other components of inventory management system 210 such as other mobile container units, mobile drive units, or mobile manipulator units in the workspace 270. In some embodiments, the robotic manipulator 800 may be configured to accommodate underneath it as few as one mobile container unit 840 or more mobile container units than depicted in FIG. 8. In embodiments, the robotic manipulator 800 may be configured to process inventory transfers while navigating between one or more container holders within a workspace. The robotic manipulator 800 may be configured to dimensions enabling navigation between various distances that may occur between the one or more container holders within the workspace depending on the configuration and placement of the one or more container holders.

Figure 9:
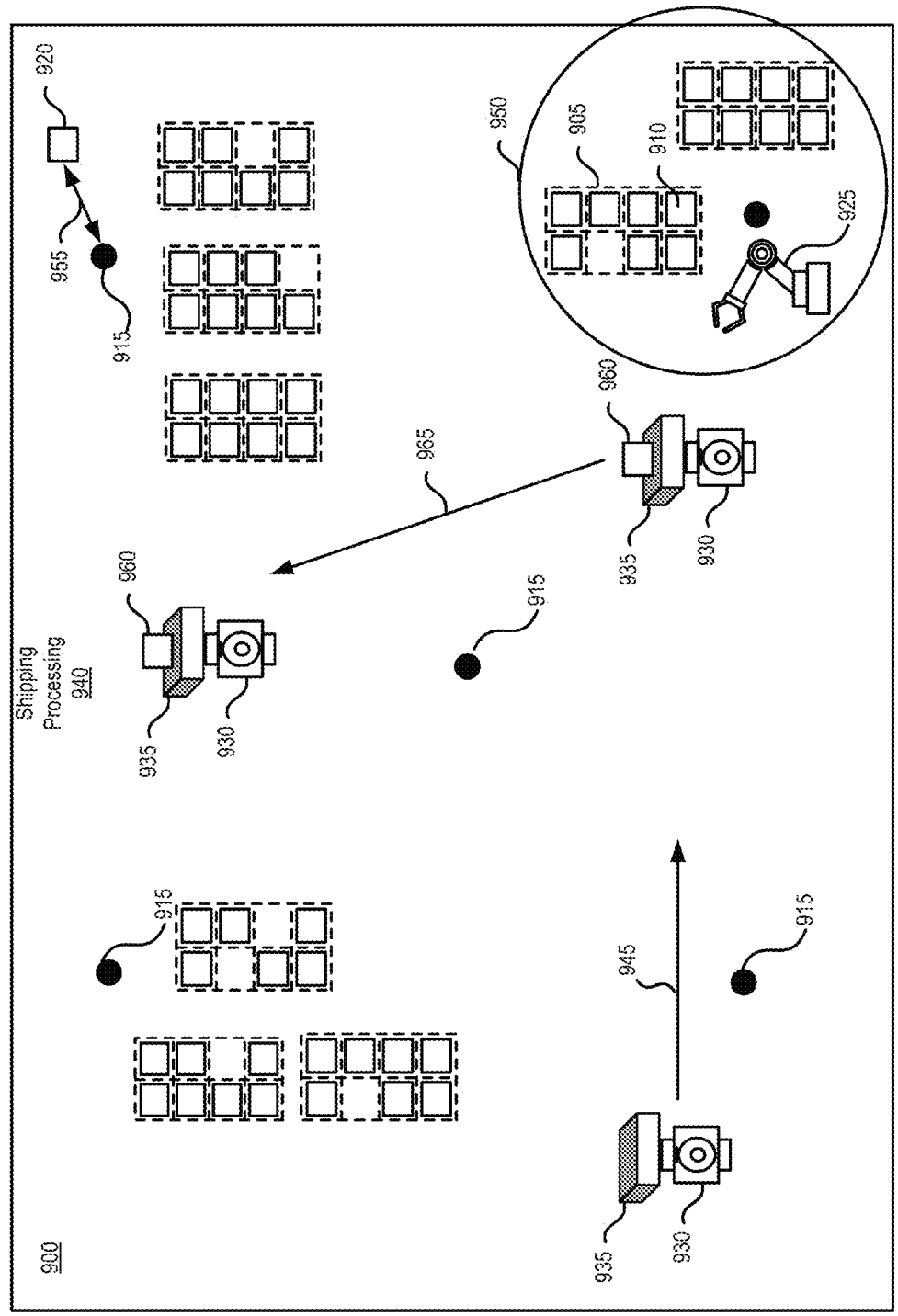
FIG. 9 illustrates an example workflow for transferring inventory within an inventory management system according to mobile inventory transfer station features described herein, in accordance with at least one embodiment.

FIG. 9 illustrates an example workflow for transferring inventory within an inventory management system according to mobile inventory transfer station features described herein, in accordance with at least one embodiment. FIG. 9 includes a workspace 900 which may be an example of workspace 270 in an inventory management system 210. The workspace 900 may comprise inventory holders 905 storing containers 910 with items of inventory, one or more access points 915, a management module 920 (which may be an example of management module 215), a mobile manipulator unit 925 with a robotic arm, a mobile container unit 930 with an associated container 935, and a shipping processing area 940. The workflow illustrated in FIG. 9 may include a first step or transition 945 that includes the mobile container unit 930 moving the associated container 935 within the workspace 900 to an area of interest or an area designated by the management module 920 for a mobile inventory transfer station 950. As described herein, the management module 920 may identify or determine the area for the mobile inventory transfer station 950 based at least in part on inventory included in inventory transfer instructions or based at least in part on characteristic of items stored in workspace 900. Further, instructions 955 may be transmitted by the management module 920, via the access points 915, to move the mobile container unit 930, associated container 935, and mobile manipulator unit 925 to form the mobile inventory transfer station 950. The area or portion of containers forming the mobile inventory transfer station 950 may exist to fulfill a single and/or multiple orders or to complete multiple inventory transfer instructions.

In accordance with at least one embodiment, upon the mobile container unit 930 and the associated container 935 reaching the area of the mobile inventory transfer station 950, the mobile manipulator unit 925 may utilize a robotic arm to transfer an item 960 to the container 935. In embodiments, the management module 920 may identify the appropriate item 960 and transmit instructions 955 to the mobile manipulator unit 925 to transfer based on received inventory transfer instructions. In some embodiments, the mobile manipulator unit 925 may transfer one or more items to the container 935 to be moved by the mobile container unit 930 according to inventory transfer instructions received by the management module 920. The workflow of FIG. 9 includes another transition or step 965 that includes the mobile container unit 930 moving the associated container 935 and item 960 to a shipping processing area 940. In some embodiments, upon the mobile container unit 930 completing the task of moving the item 960 to the shipping processing area 940, the mobile inventory transfer station 950, or information identifying the station 950, may be removed or no longer maintained by the management module 920. The management module 920 may form a new mobile inventory transfer station or may maintain multiple mobile inventory transfer stations within the workspace 900 at any given time, using any combination of mobile container units 930 and mobile manipulator units 925. In accordance with at least one embodiment, upon completion of the task, by the mobile container unit 930 and mobile manipulator unit 925, instructions may be provided to both units (925 and 930) to move to a different area within workspace 900 and form another mobile inventory transfer station for transferring inventory according to inventory transfer instructions. In some embodiments, a mobile manipulator unit 925 may be situated in a default location that is near one or more historic areas of interest or sites of historic mobile inventory transfer stations. The default locations may be determined by the management module 920 and based on previous locations of the mobile inventory transfer stations within the workspace 900.

Figure 10:
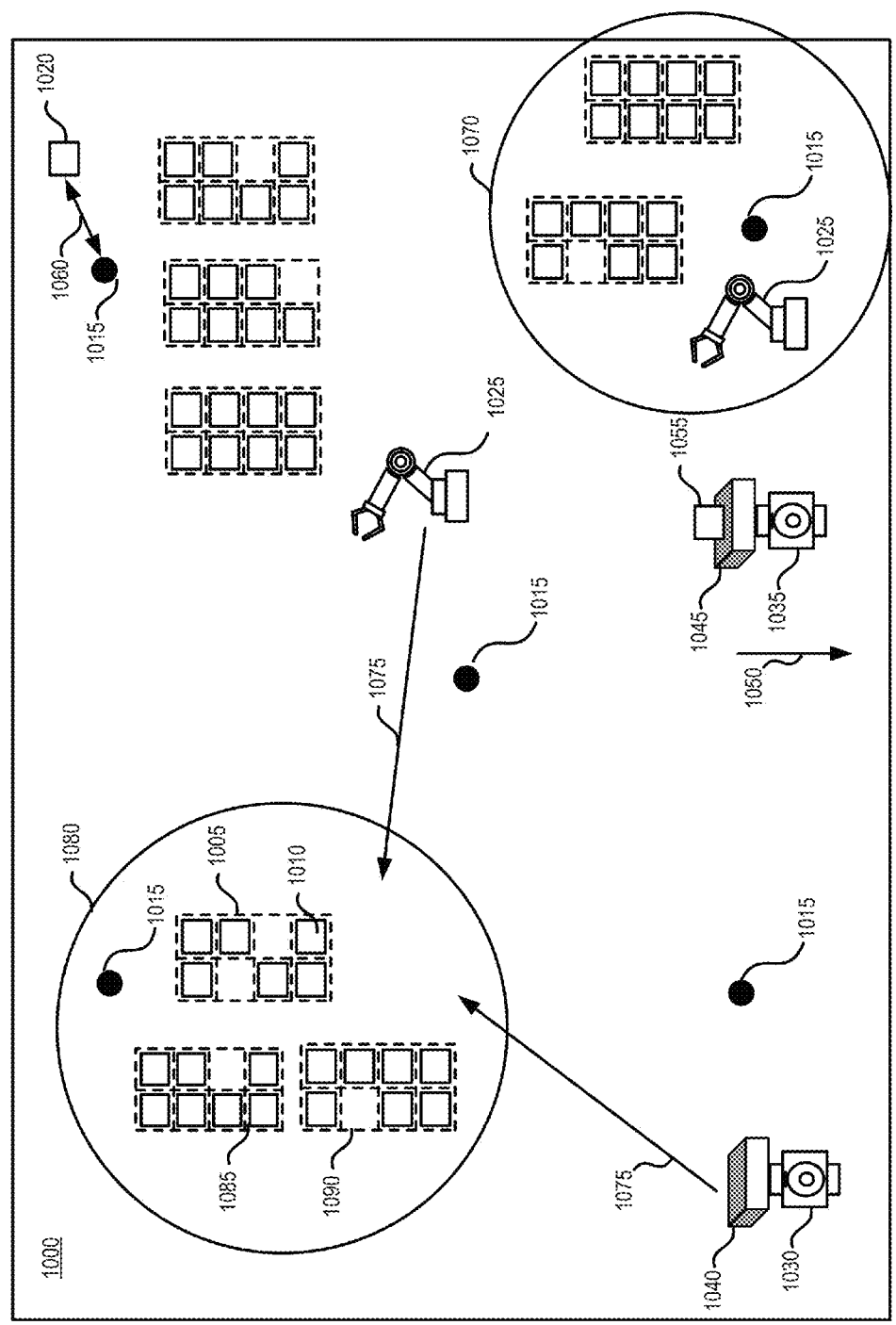
FIG. 10 illustrates an example workflow for transferring inventory within an inventory management system according to mobile inventory transfer station features described herein, in accordance with at least one embodiment.

FIG. 10 illustrates an example workflow for transferring inventory within an inventory management system according to mobile inventory transfer station features described herein, in accordance with at least one embodiment. FIG. 10 includes a workspace 1000 which may be an example of workspace 270 in an inventory management system 210. The workspace 1000 may comprise inventory holders 1005 storing containers 1010 with items of inventory, one or more access points 1015, a management module 1020 (which may be an example of management module 215), a mobile manipulator unit 1025 with a robotic arm, and mobile container units 1030 and 1035 with associated containers 1040 and 1045. The workflow illustrated in FIG. 10 may include a first step or transition 1050 that includes the mobile container unit 1035 moving the associated container 1045 and item 1055 outside the workspace 1000 based on instructions 1060 by the management module 1020. The mobile manipulator unit 1025 and mobile container unit 1035 may have formed or previously been in an area representative of mobile inventory transfer station 1070.

FIG. 10 may include another step or transition 1075 for forming a new mobile inventory transfer station 1080. In embodiments, the mobile manipulator unit 1025 may be provided instructions, by the management module 1020 via access points 1015, to move to the mobile inventory transfer station 1080 for fulfilling a customer order or to complete inventory transfer instructions. Similarly, instructions may be provided to mobile container unit 1030 to move associated container 1040 to form the new mobile inventory transfer station 1080 within workspace 1000. Upon arriving at the mobile inventory transfer station 1080, indications of the location of mobile units 1025 and 1030 may be provided to management module 1020 to cause the provision of further instructions to mobile units 1025 and 1030 to transfer inventory such as container 1010. In embodiments, the mobile manipulator unit 1025 may have been selected by the management module 1020 based on a distance between the location of the mobile manipulator unit 1025 within the workspace to the intended area of the new mobile inventory transfer station 1080. Further, the mobile container unit 1030 may have been selected for forming the new mobile inventory transfer station 1080 and transferring inventory based on an indication that the mobile container unit 1030 was idle or not actively perform a task generated by management module 1020. In accordance with at least one embodiment, forming the new mobile inventory transfer station 1080 may include moving particular container holders (such as inventory holder 1005) from one area within the workspace 1000 to another area within the workspace 1000. In embodiments, forming the new mobile inventory transfer station 1080 may include moving a portion of container holders (such as inventory holder 1005, inventory holder 1085, and inventory holder 1090) from an initial or first configuration to a different configuration within an area associated with the new mobile inventory transfer station 1080. In some embodiments, inventory holders may be moved from a first mobile inventory transfer station (such as 1070) to the new mobile inventory transfer station 1080. In embodiments, mobile drive units may be configured to receive instructions for moving or rearranging container holders (inventory holders 1005, 1085, and 1090) to form a mobile inventory transfer station. The moving or rearranging of container holders within the workspace to form virtual mobile inventory transfer stations may be based on item characteristics of items stored in the respective container holders or based on inventory transfer instructions. The mobile inventory transfer stations may be formed dynamically at any location within the workspace by any number or combination of independently controlled or instructed inventory holders, mobile drive units, mobile container units, and/or mobile manipulator units.

Figure 11:
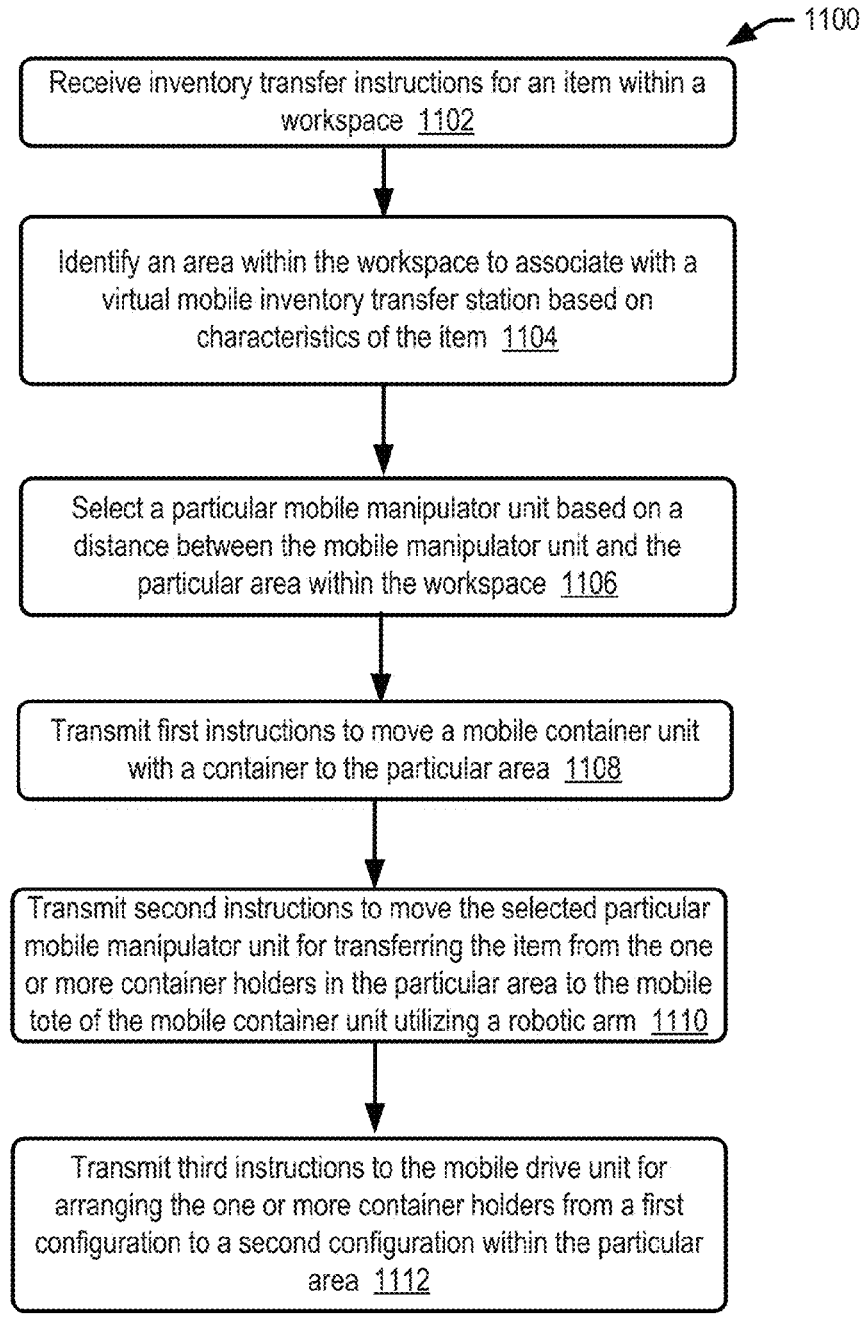
FIG. 11 illustrates a flow diagram depicting example acts for implementing techniques relating to mobile inventory transfer station features within an inventory management system as described herein, in accordance with at least one embodiment.
Figure 12:
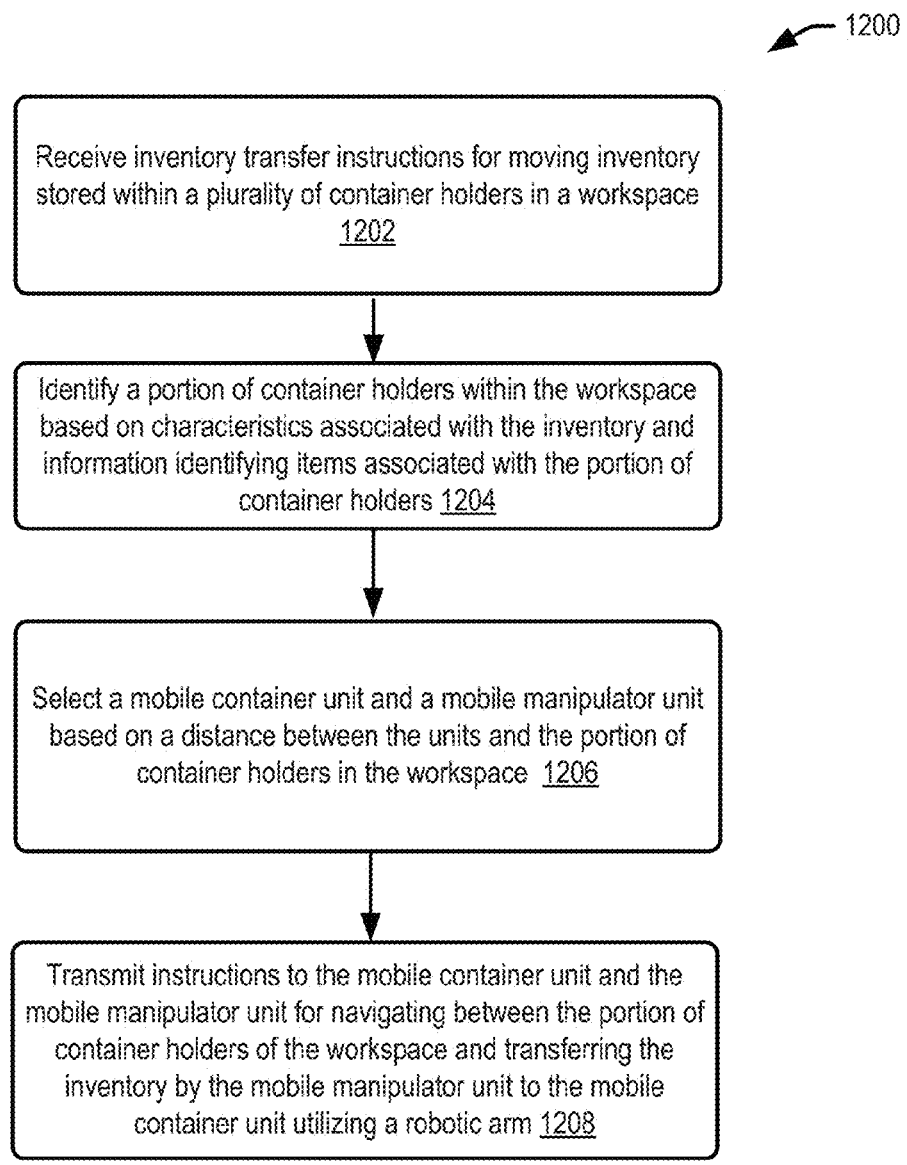
FIG. 12 illustrates a flow diagram depicting example acts for implementing techniques relating to mobile inventory transfer station features within an inventory management system as described herein, in accordance with at least one embodiment.

FIGS. 11 and 12 illustrate flow diagrams depicting example acts for implementing techniques relating to mobile inventory transfer station features within an inventory management system as described herein, in accordance with at least one embodiment. The management module 215 (FIGS. 2 and 3) may perform the processes 1100 and 1200 of FIGS. 11 and 12. The example steps included in processes 1100 and 1200 include one or more operations. However, the order in which the operations are described is not intended to be construed as a limitation, and any number of the described operations can be combined in any order and/or in parallel to implement the described flows. The process 1100 may include receiving inventory transfer instructions for an item within a workspace at 1102. For example, the inventory transfer instructions may include an order by a customer for an item stored within the workspace, an order to consolidate inventory with the workspace, or an order to transfer inventory from one workspace to another workspace. The process 1100 may include identifying a particular area within the workspace based at least in part on characteristics associated with the item at 1104. In embodiments, the management module 215 may identify the items included in the inventory transfer instructions and maintain one or more item characteristics for the item including item throughput velocity within the workspace, item type, packaging type for the item, etc., and determine a portion of inventory holders within the workspace that can be utilized for forming a mobile inventory transfer station.

The process 1100 may include selecting a particular mobile manipulator unit based on a distance between the mobile manipulator unit and the particular area within the workspace 1106 and/or based on a capability of a particular mobile manipulator unit, e.g., a particular end of arm tool or lifting capacity. In embodiments, the management module 215 may select an appropriate mobile manipulator unit to increase efficiency and item throughput for inventory transfer within the inventory management system 210. Particular mobile manipulator units may be selected for forming mobile inventory transfer stations based on their current location and the distance of their current location to the potential location for the mobile inventory transfer station. For example, the management system would likely not select a particular mobile manipulator unit if its current location required it to traverse the entire length of the workspace 270 to reach the potential area of interest. In accordance with at least one embodiment, a selection of one or more mobile container units that are holding associated containers and a selection of one or more mobile drive units to move one or more container holders may accompany the selection of the particular mobile manipulator unit at 1106. The process 1100 may include transmitting first instructions to move a mobile container unit with a container to the particular area at 1108. In embodiments, the first instructions may be transmitted to the mobile container unit via access points situated throughout the workspace 270 and inventory management system 210. The process 1100 may include transmitting second instructions to move the selected particular mobile manipulator unit for transferring the item from a container holder in the particular area to the container of the mobile container unit utilizing a robotic arm at 1110. In some examples, the mobile manipulator unit may utilize a robotic arm with a particular end of arm tool to transfer the inventory between the container holder and the mobile container unit. The process 1100 may conclude at 1112 by transmitting third instructions to the mobile drive unit for arranging the one or more container holders from a first configuration to a second configuration within the particular area. In embodiments, the process 1100 may include transmitting third instructions for moving the mobile container unit with the item in the associated container to another area for further inventory transfer processing. Further inventory transfer processing can include preparing the item for shipping, performing quality control, or human oversight operations.

The process 1200 may include receiving inventory transfer instructions for moving inventory stored within a plurality of container holders in a workspace at 1202. In some embodiments, inventory may be stowed in the container holders according to the inventory transfer instructions. The process 1200 can include identifying a portion of container holders within the workspace based on characteristics associated with the inventory and information identifying items associated with the portion of container holders 1204. For example, the management module may maintain information identifying what items are stored in which particular container holders within a workspace. The process 1200 may include selecting a mobile drive unit, a mobile container unit, and a mobile manipulator unit based on a distance between the mobile units and the portion of container holders in the workspace at 1206 and/or based on capabilities or states of the mobile units. The management module 215 may maintain one or more rules or thresholds indicating a particular minimum distance to be considered for selection as appropriate for forming the mobile inventory transfer station near the identified portion of container holders. The rules or thresholds may be further based at least in part on characteristics of the item. For example, high throughput velocity items may have a higher threshold whereas lower throughput velocity items may have a lower threshold. The process 1200 may conclude at 1208 by transmitting instructions to the mobile drive unit, the mobile container unit, and the mobile manipulator unit for navigating between the portion of container holders of the workspace, which container holders may be moved or reoriented by the mobile drive unit, and transferring the inventory by the mobile manipulator unit to the mobile container unit utilizing a robotic arm. In embodiments, the mobile manipulator unit may transfer one or more items to multiple containers associated and moved by the mobile container unit or by multiple mobile container units.

Figure 13:
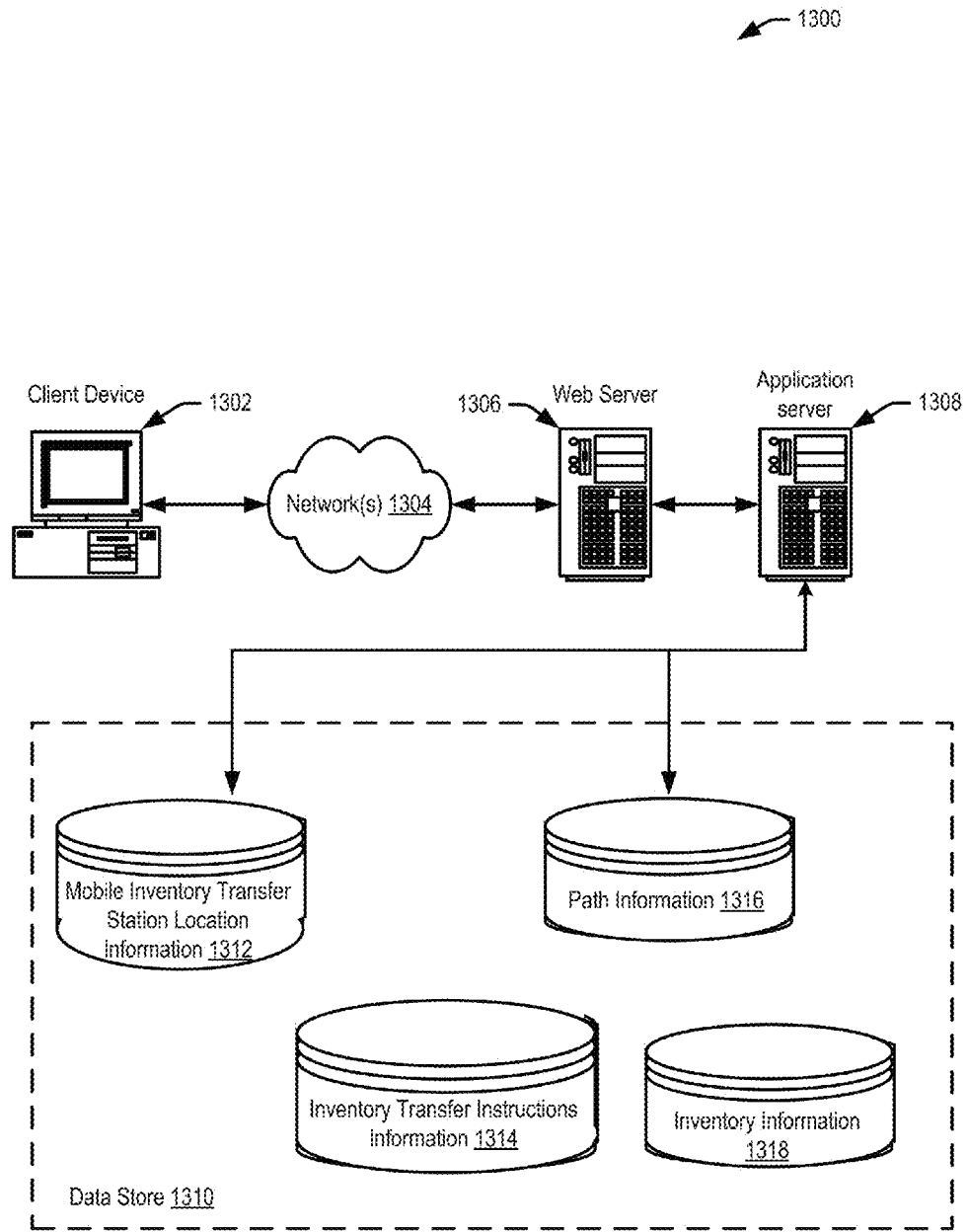
FIG. 13 illustrates an environment in which various features of the mobile inventory transfer station within the inventory management system can be implemented, in accordance with at least one embodiment.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing information which can be used by modules described herein, such as mobile inventory transfer station location information 1312, inventory transfer instructions information 1314, path information 1316, and/or inventory information 1318, which may include information about the mobile units and other components of the inventory management system. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
a plurality of container holders arranged within a first area of a workspace, a container holder of the plurality of container holders comprising one or more containers for storage of inventory items;
a plurality of mobile drive units, each mobile drive unit configured to move container holders of the plurality of container holders, using an associated propulsion component, within the workspace according to first instructions received from an inventory management module;
a plurality of mobile manipulator units configured to move within the workspace according to second instructions received from the inventory management module, at least one of the plurality of mobile manipulator units comprising:
a robotic arm configured to transfer the inventory items between the one or more containers and a subset of containers for transferring inventory;
a plurality of mobile container units configured to move the subset of containers within the workspace according to third instructions received from the inventory management module; and
a processor coupled with memory, configured to implement the inventory management module to:
receive inventory transfer instructions for an item within the workspace;
generate a virtual mobile inventory transfer station in a second area within the workspace based at least in part on characteristics of the item in the inventory transfer instructions and first information indicating a location of a portion of the container holders associated with the item within the workspace, the virtual mobile inventory transfer station comprising the portion of the container holders, a particular mobile drive unit of the plurality of mobile drive units, a particular mobile container unit of the plurality of mobile container units, and a particular mobile manipulator unit of the plurality of mobile manipulator units, the virtual mobile inventory transfer station not previously associated with the second area;
transmit the first instructions to the propulsion component of the particular mobile drive unit, the propulsion component configured to move the portion of the container holders from the first area to the second area;
transmit the second instructions for moving the particular mobile manipulator unit from a third area of the workspace to the second area and transferring, utilizing the robotic arm, the item from a particular container of the subset of containers to at least one of the portion of the container holders; and
transmit the third instructions to the particular mobile container unit for moving from a fourth area of the workspace to the second area, the particular mobile container unit comprising the particular container containing the item for transfer to the at least one of the portion of the container holders.

2. The inventory management system of claim 1, wherein the characteristics of the item comprise at least one of metrics that identify a velocity of throughput for the item, historic order information associated with the item indicating one or more other items that are historically included in an order for the item, second information indicating a distance between where the item is stored within the workspace and a third area for inventory transfer processing, third information indicating a packing type associated with the item, or physical characteristic information associated with the item.

3. The inventory management system of claim 1, wherein the third instructions are based at least in part on the second area and the inventory transfer instructions.

4. The inventory management system of claim 3, wherein the inventory management module is further configured to transmit fourth instructions to the particular mobile container unit for moving to a fifth area within the workspace and for transferring another item within the workspace based on other inventory transfer instructions.

5. The inventory management system of claim 1, wherein each mobile container unit of the plurality of mobile container units is further configured to interact with and move the subset of containers within the workspace.

6. A computer-implemented method, comprising:
receiving, by a computer system comprising a processor and memory, inventory transfer instructions for moving an inventory item stored or to be stored within at least one container holder of a plurality of container holders within a workspace;

identifying, by the computer system, a portion of container holders of the plurality of container holders within the workspace based at least in part on characteristics associated with the inventory item identified by the inventory transfer instructions and further based at least in part on first information identifying inventory items associated with the portion of container holders;

generating, by the computer system, a virtual mobile inventory transfer station to associate in an area within the workspace based at least in part on identifying the portion of container holders, the identified area within the workspace comprising an approximate location of the portion of container holders, the virtual mobile inventory transfer station not previously associated with the area;

selecting, by the computer system, a mobile container unit and a mobile manipulator unit based at least in part on respective distances between each of the mobile container unit and the mobile manipulator unit within the workspace and the identified area within the workspace for the virtual mobile inventory transfer station, the mobile container unit configured to carry a mobile container using an associated propulsion component, and the mobile manipulator unit comprising a robotic arm configured to transfer inventory items between the mobile container of the mobile container unit and the at least one container holder of the portion of container holders;

transmitting, by the computer system, first instructions to the mobile manipulator unit for navigating to the identified area within the workspace for the virtual mobile inventory transfer station and transferring, by the robotic arm, the inventory item between the at least one container holder and the mobile container of the mobile container unit; and transmitting, by the computer system, second instructions to the mobile container unit for navigating to the identified area within the workspace for the virtual mobile inventory transfer station with the mobile container, the propulsion component of the mobile container unit using the second instructions to navigate to the identified area.

7. The computer-implemented method of claim 6, further comprising maintaining second information identifying a location of each container holder of the plurality of container holders within the workspace, wherein identifying the portion of container holders is further based at least in part on the second information.

8. The computer-implemented method of claim 6, further comprising second information identifying respective default locations within the workspace for each of the mobile container unit and the mobile manipulator unit, wherein respective distances between the respective default locations of each of the mobile container unit and the mobile manipulator unit and the area within the workspace for the virtual mobile inventory transfer station is based at least in part on the second information.

9. The computer-implemented method of claim 6, wherein the first instructions for the mobile manipulator unit and the second instructions for the mobile container unit comprise respective optimized paths to the area within the workspace for the virtual mobile inventory transfer station, the respective optimized paths determined based at least in part on the inventory transfer instructions.

10. The computer-implemented method of claim 6, wherein the first instructions and the second instructions identify respective velocities for the mobile manipulator unit and the mobile container unit to maintain while navigating within the area within the workspace for the virtual mobile inventory transfer station.

11. The computer-implemented method of claim 6, further comprising transmitting third instructions to the mobile container unit for navigating to a shipping area of the workspace based at least in part on an indication from the mobile manipulator unit that the inventory item has been transferred to the mobile container.

12. The computer-implemented method of claim 6, further comprising selecting, by the computer system, a plurality of mobile manipulator units to transfer the inventory item based at least in part on respective locations of each mobile manipulator unit of the plurality of mobile manipulator units and respective distances to the area within the workspace for the virtual mobile inventory transfer station.

13. The computer-implemented method of claim 6, wherein the inventory transfer instructions comprise one or more customer orders for inventory items stored in the workspace, the first instructions to the mobile manipulator unit and the second instructions to the mobile container unit further identifying the inventory items required for fulfilling the one or more customer orders utilizing the identified portion of container holders within the workspace.

14. An inventory management system, comprising:

a plurality of container holders arranged within a first area of a workspace, a container holder of the plurality of container holders comprising one or more containers for storage of inventory items;

a plurality of mobile container units configured to move a subset of containers for transferring inventory within the workspace using an associated propulsion component according to first instructions;

a plurality of mobile manipulator units configured to move within the workspace according to second instructions, at least one of the plurality of mobile manipulator units comprising:

a robotic arm configured to transfer the inventory items between the one or more containers and a particular container of the subset of containers of at least one of the plurality of mobile container units;

a plurality of mobile drive units, each mobile drive unit configured to move container holders of the plurality of container holders within the workspace according to third instructions; and a processor coupled with memory, configured to implement a management module to:

receive inventory transfer instructions for an inventory item within the workspace;

generate a virtual mobile inventory transfer station to associate in a particular area within the workspace based at least in part on characteristics of the inventory item, the particular area including at least one container holder of the plurality of container holders, the virtual mobile inventory transfer station not previously associated with the particular area;

select a particular mobile container unit of the plurality of mobile container units based at least in part on a distance between a second area of the workspace associated with the particular mobile container unit and the particular area within the workspace associated with the virtual mobile inventory transfer station;

select a particular mobile manipulator unit of the plurality of mobile manipulator units based at least in part on a distance between a third area of the workspace associated with the particular mobile manipulator unit and the particular area within the workspace associated with the virtual mobile inventory transfer station;
select a particular mobile drive unit of the plurality of mobile drive units based at least in part on a distance between a fourth area of the workspace associated with the particular mobile drive unit and the particular area within the workspace associated with the virtual mobile inventory transfer station;
transmit the first instructions to move the particular mobile container unit of the plurality of mobile container units using the associated propulsion component from the second area of the workspace to the particular area associated with the virtual mobile inventory transfer station;
transmit the second instructions to move the particular mobile manipulator unit from the third area of the workspace to the particular area associated with the virtual mobile inventory transfer station and to transfer the inventory item, utilizing the robotic arm, from the at least one container holders to the particular container of the particular mobile container unit;
transmit the third instructions to move the particular mobile drive unit from the fourth area of the workspace to the particular area associated with the virtual mobile inventory transfer station and to arrange the at least one container holder from a first configuration to a second configuration within the particular area based at least in part on the inventory transfer instructions.

15. The inventory management system of claim 14, wherein the particular mobile manipulator unit further comprises an image capture device.

16. The inventory management system of claim 15, wherein the image capture device is utilized to capture images of the inventory item as the inventory item is transferred to the particular container.

17. The inventory management system of claim 14, wherein the particular mobile manipulator unit further comprises a plurality of robotic arms configured to transfer inventory items within the workspace, each robotic arm of the plurality of robotic arms associated with a different end of arm tool with associated grasping capabilities.

18. The inventory management system of claim 14, wherein identifying the particular area within the workspace is based at least in part on a number of mobile manipulator units that are within a certain distance of the particular area and a policy for reducing resource usage by a potentially selected mobile manipulator unit while transferring inventory items within the workspace.

19. The inventory management system of claim 14, wherein selecting the particular mobile manipulator unit is further based at least in part on an amount of time calculated for the particular mobile manipulator unit to fulfill the inventory transfer instructions.

20. The inventory management system of claim 14, wherein selecting the particular mobile manipulator unit comprises selecting two or more mobile manipulator units based at least in part on a determined first amount of time utilizing the particular mobile manipulator unit to fulfill the inventory transfer instructions and a determined second amount of time utilizing the two or more mobile manipulator units to fulfill the inventory transfer instructions.

* * * * *